(12) United States Patent
Champagne et al.

(10) Patent No.: US 11,286,007 B2
(45) Date of Patent: Mar. 29, 2022

(54) MOTORIZED VEHICLE

(71) Applicant: StyL&Tech Inc., Québec (CA)

(72) Inventors: Roch Champagne, Québec (CA); Maxim Lambert, Québec (CA); Jean-Francois Lépine, Québec (CA)

(73) Assignee: StyL&Tech Inc., Quebec (CA)

( * ) Notice: Subject to any disclaimer, the term of this patent is extended or adjusted under 35 U.S.C. 154(b) by 24 days.

(21) Appl. No.: 16/650,242

(22) PCT Filed: Sep. 24, 2018

(86) PCT No.: PCT/CA2018/051198
§ 371 (c)(1),
(2) Date: Mar. 24, 2020

(87) PCT Pub. No.: WO2019/068173
PCT Pub. Date: Apr. 11, 2019

(65) Prior Publication Data
US 2020/0239083 A1    Jul. 30, 2020

Related U.S. Application Data

(60) Provisional application No. 62/567,476, filed on Oct. 3, 2017.

(51) Int. Cl.
*B62D 31/02* (2006.01)
*B62D 27/02* (2006.01)

(52) U.S. Cl.
CPC .......... *B62D 31/02* (2013.01); *B62D 27/023* (2013.01); *B62D 27/026* (2013.01)

(58) Field of Classification Search
CPC ...... B62D 31/02; B62D 31/00; B62D 27/023; B62D 27/026
(Continued)

(56) References Cited

U.S. PATENT DOCUMENTS 3,269,072 A * 8/1966 Black ................... B61D 17/10
52/377
3,697,124 A   10/1972 Wessells
(Continued)

FOREIGN PATENT DOCUMENTS

CA    2205048 A1    5/1996
CA    2189843 A1    10/1996
(Continued)

OTHER PUBLICATIONS

PCT International Search Report and Written Opinion dated Dec. 6, 2018 for PCT/CA2018/051198.

*Primary Examiner* — Dennis H Pedder
(74) *Attorney, Agent, or Firm* — Honigman LLP

(57) ABSTRACT

The present disclosure concerns a vehicle. The vehicle comprises a structural frame having a longitudinal axis and comprising a roof structure, a floor structure vertically spaced apart from the roof structure, first and second sidewalls extending substantially parallel to the longitudinal axis, between the roof structure and the floor structure and being transversally spaced apart from one another. Each of the first and second sidewalls has an upper edge region mechanically connected to the roof structure and a lower edge region supported by the floor structure. At least the first sidewall comprises at least one structural frame member extending substantially diagonally between the upper edge region and the lower edge region of the first sidewall. The vehicle further comprises an energy supply support mounted to and supported by the roof structure.

20 Claims, 17 Drawing Sheets

(58) Field of Classification Search
USPC ....... 296/178, 181.1, 193.05, 203.01, 203.03
See application file for complete search history.

(56) References Cited

U.S. PATENT DOCUMENTS

| | | |
|---|---|---|
| 5,140,913 A | 8/1992 | Takeichi et al. |
| 5,150,944 A | 9/1992 | Yoshida et al. |
| 5,918,548 A * | 7/1999 | Elsner .................... B61D 17/04 |
| | | 105/397 |
| 6,375,249 B1 | 4/2002 | Stanton et al. |
| 6,422,156 B1 | 7/2002 | Winsor et al. |
| 6,425,626 B1 | 7/2002 | Kloepfer |
| 6,802,521 B1 | 10/2004 | Boughton |
| 7,025,166 B2 | 4/2006 | Thomas |
| 7,673,424 B2 | 3/2010 | Collignon |
| 7,677,652 B2 | 3/2010 | Mollick et al. |
| 7,862,101 B2 | 1/2011 | Lusk et al. |
| 7,897,235 B1 | 3/2011 | Locher et al. |
| 8,528,683 B2 | 9/2013 | Beavis et al. |
| 9,315,213 B2 | 4/2016 | Raymond |
| 9,533,716 B2 | 1/2017 | Stanton |
| 2008/0116714 A1* | 5/2008 | Timmermans ........ G09F 21/048 |
| | | 296/178 |
| 2017/0240215 A1 | 8/2017 | LaRose et al. |

FOREIGN PATENT DOCUMENTS

| | | | |
|---|---|---|---|
| CA | 2956267 A1 | 4/2016 | |
| CN | 2761494 Y | 3/2006 | |
| DE | 2840832 A1 | 4/1980 | |
| FR | 2188549 A7 | 1/1974 | |
| GB | 44513 A | 3/1936 | |
| KR | 101675425 B1 * | 11/2016 | .......... B60L 11/1822 |
| WO | 2006048632 A1 | 5/2006 | |

* cited by examiner

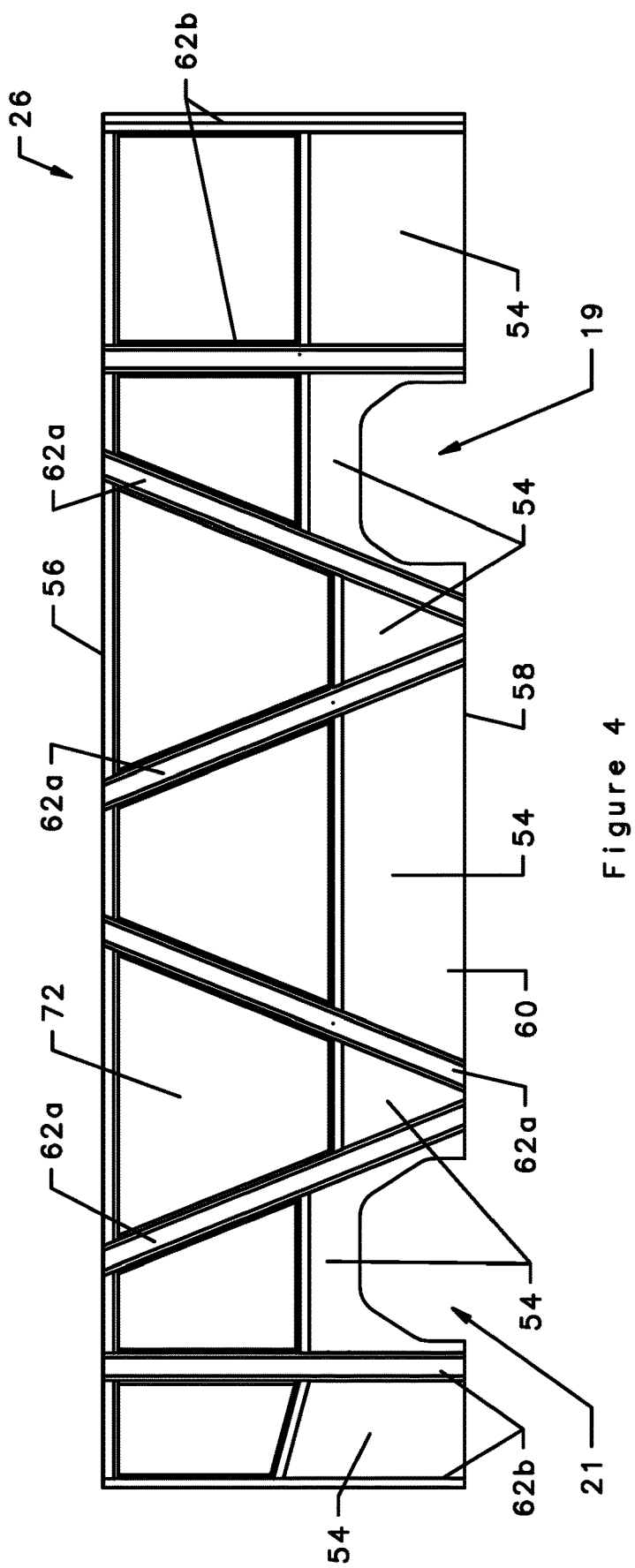

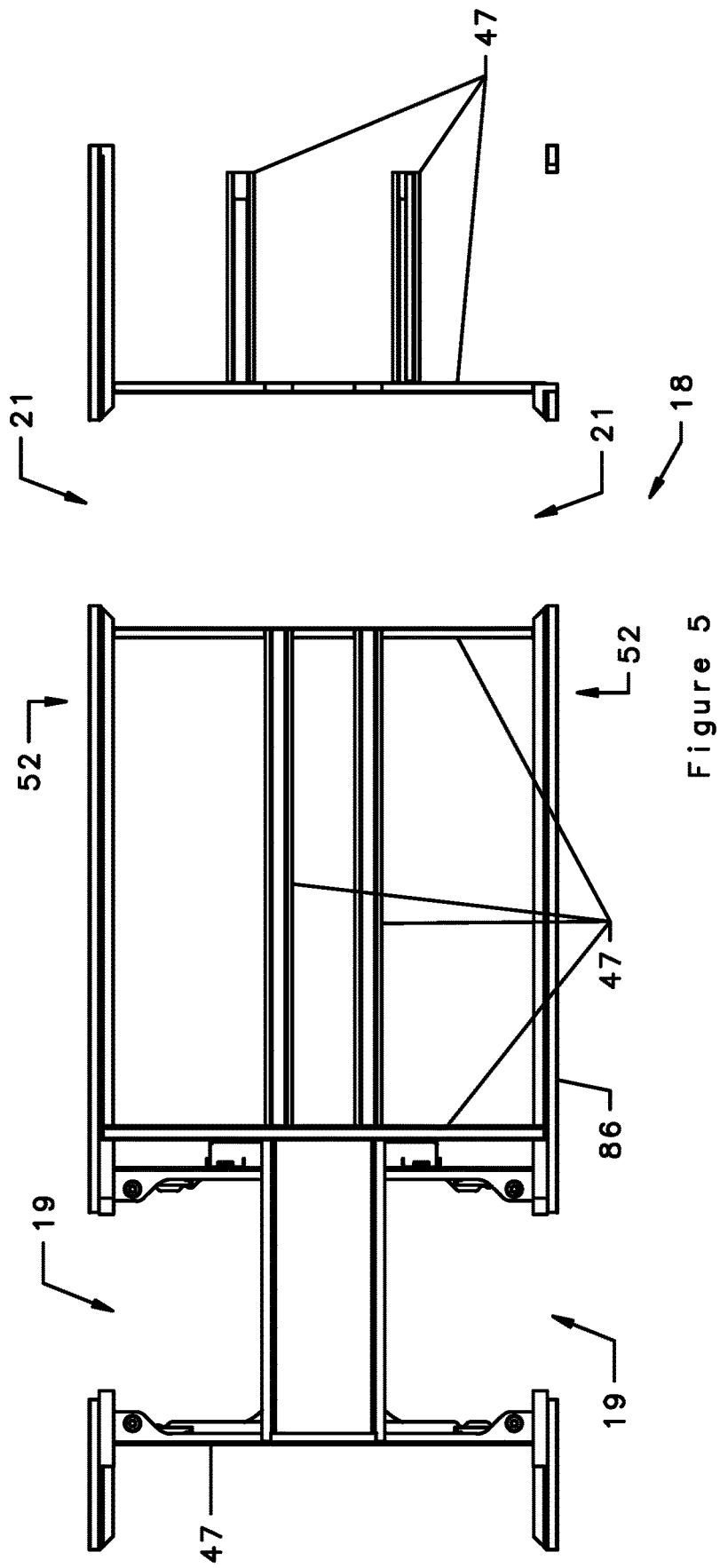

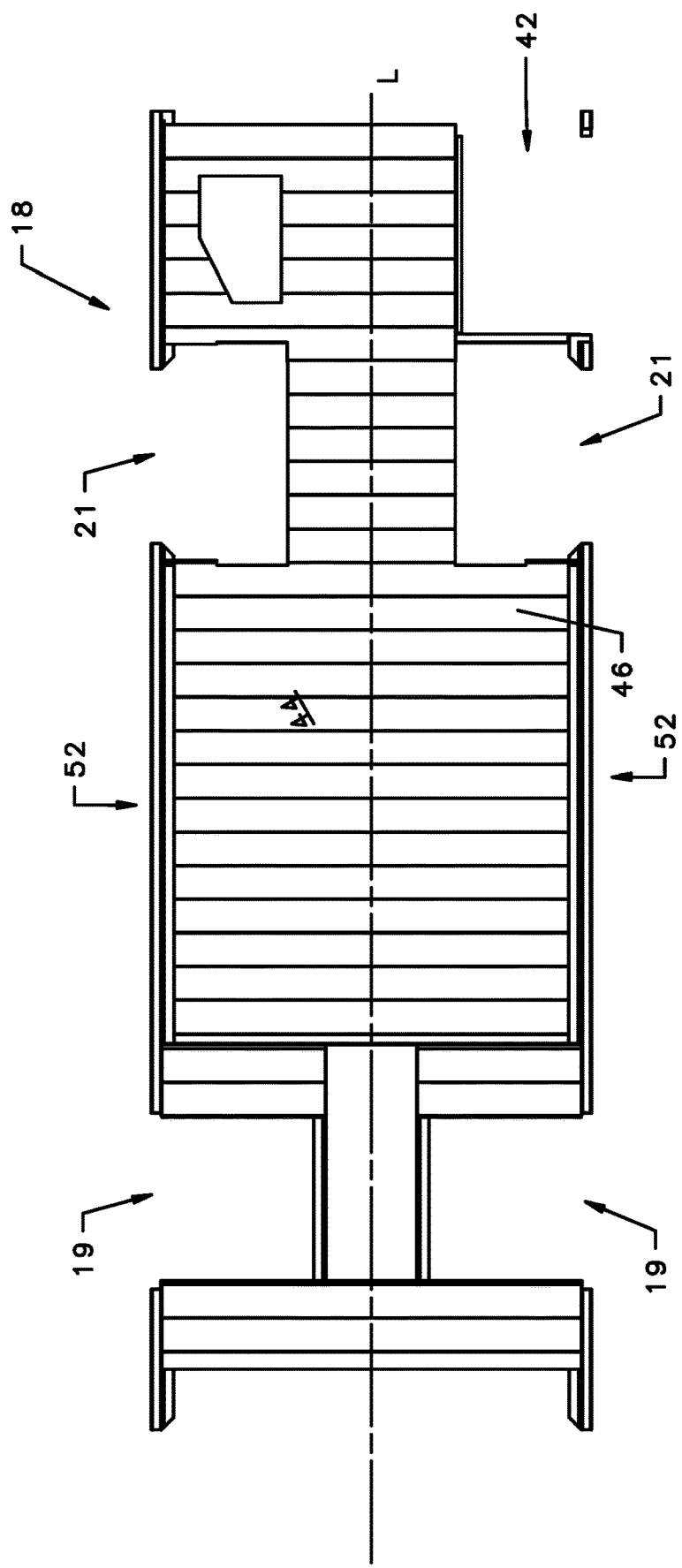

MOTORIZED VEHICLE

CROSS-REFERENCE TO RELATED APPLICATIONS

This application is a National Phase Application of PCT/CA2018/051198 filed Sep. 24, 2018, which claims priority of U.S. provisional patent application 62/567,476 filed on Oct. 3, 2017, the specifications of which are hereby incorporated by reference in their entirety.

TECHNICAL FIELD

The technical field relates to a motorized vehicle and more specifically, to a motorized vehicle for carrying passengers such as midibuses, minibuses and buses.

BACKGROUND

Passenger carrying vehicles such as midibuses, minibuses and buses generally comprise a passenger carrying structural frame or a cabin supporting, directly or indirectly, a powertrain and driveline components (engine, transmission, axles, suspension, differential, driveshafts, and brakes) and steering components. The structural frame comprises a roof and side panels and is generally made of metal (such as steel) tubings and beams joined by welding.

It is generally an aim in the transportation industry to reduce the energy consumption, such as fuel consumption. Reduction of fuel consumption can be obtained by reducing the weight of the vehicle and/or designing electric or hybrid vehicles. In an embodiment, the weight of the vehicles can be reduced through redesign of the structural frame. The structural frame supports the mechanical components of the vehicle and is subjected to static and dynamic loads. In the case of electric or hybrid vehicles, a major load is the battery pack. Thus, when redesigning an electric/hybrid vehicle structural frame to reduce the structural frame weight, the weight of the battery pack must be taken into account during the redesign process. More particularly, the resulting loading condition requires a structural frame different than for typical diesel buses to ensure sufficient stiffness while meeting weight reduction objectives.

In view of the above, there is thus a need for a motorized vehicle which would be able to overcome or at least minimize some of the above-discussed prior art concerns.

BRIEF SUMMARY

According to a general aspect, there is provided a vehicle, which can be a motorized vehicle. The vehicle comprises a structural frame having a longitudinal axis. The structural frame of the vehicle comprises: a roof structure; a floor structure vertically spaced apart from the roof structure; and first and second sidewalls extending substantially parallel to the longitudinal axis, between the roof structure and the floor structure and being transversally spaced apart from one another, each one of the first and second sidewalls having an upper edge region mechanically connected to the roof structure and a lower edge region supported by the floor structure. At least the first sidewall comprises at least one diagonally-extending structural frame member extending substantially diagonally between the upper edge region and the lower edge region of the first sidewall. The vehicle further comprises an energy supply support mounted to and supported by the roof structure.

In an embodiment, the at least one diagonally-extending structural frame member extends between the upper edge region and the lower edge region at an angle ranging between about 55 degrees and about 85 degrees with respect to a horizontal axis. The at least one diagonally-extending structural frame member can extend between the upper edge region and the lower edge region at an angle ranging between about 65 degrees and about 75 degrees with respect to a horizontal axis.

In an embodiment, the vehicle further comprises: a front axle supporting assembly mounted to the floor structure and a rear axle supporting assembly mounted to the floor structure and being spaced apart longitudinally from the front axle supporting assembly. The first sidewall has a central section longitudinally extending between the front and rear axle supporting assemblies with the at least one diagonally-extending structural frame member extending in the central section of the first sidewall. The first sidewall can have a length, the central section extending along between about 35% and about 60% of the length of the first sidewall. The at least one diagonally-extending structural frame member can comprise at least one pair of diagonally-extending structural frame members extending substantially diagonally between the upper edge region and the lower edge region in the central section of the first sidewall. The diagonally-extending structural frame members of a respective one the at least one pair can be angled in opposed directions. Each one of the diagonally-extending structural frame members of the respective one the at least one pair can have a lower end and an upper end, the lower ends of the diagonally-extending structural frame members of the respective one the at least one pair being closer to one another than the upper ends of the diagonally-extending structural frame members of the respective one the at least one pair. The diagonally-extending structural frame members can be arranged so as to define a plane of symmetry extending substantially transversally relative to the longitudinal axis. The plane of symmetry can extend substantially vertically. A distance between the lower ends of the diagonally-extending structural frame members can be comprised between about 30 mm and about 60 mm. A distance between the upper ends of the diagonally-extending structural frame members can be comprised between about 1000 mm and about 2500 mm.

The at least one diagonally-extending structural frame member can comprise at least first and second pairs of diagonally-extending structural frame members extending substantially diagonally between the upper edge region and the lower edge region in the central section of the first sidewall.

In an embodiment, the first sidewall further comprises at least one side panel extending upwardly from the lower edge region, the at least one diagonally-extending structural frame member being secured to the side panel. The at least one diagonally-extending structural frame member can be bonded to the at least one side panel along a bonding surface. The at least one side panel can comprise an inner sheet, an outer sheet, and a lightweight core sandwiched between and bonded to the inner sheet and the outer sheet. The lightweight core of the at least one side panel can comprise a polymeric foam material. The lightweight core can be discontinuous. The at least one diagonally-extending structural frame member can have an inner surface and an outer surface, wherein at least one of the inner sheet and the outer sheet of the at least one side panel comprises a section extending past the lightweight core, the section abutting against a corresponding one of the inner surface and the outer surface of the at least one diagonally-extending structural frame member. The section of the at least one of the inner sheet and the outer sheet can be bonded to the corresponding one of the inner surface and the outer surface of the at least one diagonally-extending structural frame member In an embodiment, the at least one diagonally-extending structural frame member is at least partially made of extruded metal or alloy.

In an embodiment, the at least one diagonally-extending structural frame member is at least partially made of aluminum.

In an embodiment, the at least one diagonally-extending structural frame member has a substantially rectangular cross-section and further comprises a flange protruding outwardly from the substantially rectangular cross-section. The substantially rectangular cross-section of the at least one diagonally-extending structural frame member can have a length and a width, the length being comprised between about 35 mm and about 200 mm, the width being comprised between about 35 mm and about 75 mm.

The at least one diagonally-extending structural frame member can comprise a hollow body having a wall, the wall having a thickness comprised between about 3 mm and about 8 mm.

The second sidewall can have a configuration of diagonally-extending structural frame members identical to the first sidewall.

In an embodiment, the floor structure has an upper and longitudinally extending floor surface and comprises a plurality of elongated floor slats engageable with adjacent ones of the elongated floor slats to form the longitudinally extending floor surface. The plurality of elongated floor slats can extend substantially perpendicular to the longitudinal axis. Each one of the elongated floor slats can comprise two opposed transversal edges, each one of the transversal edges having an interlocking joint with the interlocking joint of a first one of the transversal edges being engageable with a second one of the transversal edges to engage together adjacent ones of the elongated floor slats. The interlocking joints can be substantially complementary in shape. The interlocking joints can be of a tongue and groove type.

In an embodiment, the roof structure has two spaced apart longitudinal edges, the structural frame further comprises a pair of elongated roof connectors transversally spaced apart from one another and extending longitudinally along the upper edge region of each one of the first and second sidewalls, each one of the elongated roof connectors having a roof receiving portion engageable with a respective one of the longitudinal edges of the roof structure and a sidewall receiving portion engageable with a respective one of the upper edge regions of the first and second sidewalls, the elongated roof connectors transferring a weight of the roof structure to the first and second sidewalls.

In an embodiment, the floor structure has two spaced apart longitudinal edges, the structural frame further comprising a pair of elongated floor connectors transversally spaced apart from one another and extending longitudinally along the lower edge region of each one of the first and second sidewalls, each one of the elongated floor connectors having a floor receiving portion engageable with a respective one of the longitudinal edges of the floor structure and a sidewall receiving portion engageable with a respective one of the lower edge regions of the first and second sidewalls.

According to another general aspect, there is provided a structural frame for a motorized vehicle. The structural frame has a longitudinal axis and comprises: a roof structure; a floor structure vertically spaced apart from the roof structure; a front axle supporting assembly mounted to the floor structure; a rear axle supporting assembly mounted to the floor structure and being spaced apart longitudinally from the front axle supporting assembly; and a pair of sidewalls extending substantially parallel to the longitudinal axis, between the roof structure and the floor structure and being transversally spaced apart from one another, the pair of sidewalls being mechanically connected to and being supported by the floor structure. Each one of the sidewalls has an upper edge region and a lower edge region and a central section longitudinally extending between the front and rear axle supporting assemblies. Each one of the sidewalls comprises, in the central section, a plurality of structural frame members extending substantially diagonally between the upper edge region and the lower edge region. The roof structure is mechanically connected to the pair of sidewalls and its weight is transferred to the floor structure at least through the diagonally-extending structural frame members.

In an embodiment, the plurality of diagonally-extending structural frame members is disposed in pairs, each one of the pairs being angled in opposed directions with lower ends being closer to one another than opposed upper ends.

In an embodiment, each one of the sidewalls further comprises at least one side panel extending upwardly from the lower edge region and being secured to at least two of the diagonally-extending structural frame members.

According to another general aspect, there is provided a structural frame for a motorized vehicle. The structural frame has a longitudinal axis and comprises: a roof structure; a floor structure vertically spaced apart from the roof structure; and a pair of sidewalls extending substantially parallel to the longitudinal axis, between the roof structure and the floor structure and being transversally spaced apart from one another, the pair of sidewalls being mechanically connected to and being supported by the floor structure. Each one of the sidewalls has an upper edge region and a lower edge region and comprises: a plurality of structural frame members extending between the upper edge region and the lower edge region; and a plurality of side panels secured to the structural frame members, each one of the side panels comprising an inner sheet, an outer sheet, and a lightweight core sandwiched between and bonded to the inner sheet and the outer sheet. The roof structure is mechanically connected to the pair of sidewalls.

In an embodiment, the plurality of side panels is bonded to the structural frame members along a bonding surface and at least a plurality of the structural frame members extends between the upper edge region and the lower edge region at an angle ranging between about 55 degrees and about 85 degrees with respect to a horizontal axis.

In an embodiment, the plurality of side panels is bonded to the structural frame members and at least a plurality of the structural frame members extends between the upper edge region and the lower edge region at an angle ranging between about 65 degrees and about 75 degrees with respect to a horizontal axis.

In an embodiment, the lightweight core of the side panels comprises a polymeric foam material.

According to still another general aspect, there is provided a structural frame for a motorized vehicle. The structural frame has a longitudinal axis and comprises: a floor structure having an upper and longitudinally extending floor surface and comprising a plurality of elongated floor slats engageable with adjacent ones of the elongated floor slats to form the longitudinally extending floor surface; a roof structure vertically spaced apart from the floor structure; and a pair of sidewalls extending substantially parallel to the longitudinal axis, between the roof structure and the floor structure and being transversally spaced apart from one another. The pair of sidewalls is mechanically connected to and being supported by the floor structure. The roof structure is mechanically connected to the pair of sidewalls.

In an embodiment, the plurality of elongated floor slats extends substantially perpendicular to the longitudinal axis.

In an embodiment, each one of the elongated floor slats comprises two opposed transversal edges, each one of the transversal edges having an interlocking joint with the interlocking joint of a first one of the transversal edges being engageable with a second one of the transversal edges to engage together adjacent ones of the elongated floor slats. In an embodiment, the interlocking joints are substantially complementary in shape and of the tongue and groove type.

According to still a further general aspect, there is provided a structural frame for a motorized vehicle. The structural frame has a longitudinal axis and comprises: a roof structure having two spaced apart longitudinal edges; a floor structure vertically spaced apart from the roof structure; a pair of sidewalls extending substantially parallel to the longitudinal axis, between the roof structure and the floor structure and being transversally spaced apart from one another, the pair of sidewalls having an upper edge region and being mechanically connected to and being supported by the floor structure; and a pair of elongated roof connectors transversally spaced apart from one another and extending longitudinally along the upper edge region of each one of the sidewalls. Each one of the elongated roof connectors has a roof receiving portion engageable with a respective one of the longitudinal edges of the roof structure and a sidewall receiving portion engageable with a respective one of the upper edge regions of the sidewalls, the elongated roof connectors transferring a weight of the roof structure to the sidewalls.

According to still another general aspect, there is provided a structural frame for a motorized vehicle. The structural frame has a longitudinal axis and comprises: a roof structure; a floor structure having two spaced apart longitudinal edges, the floor structure being vertically spaced apart from the roof structure; a pair of sidewalls extending substantially parallel to the longitudinal axis, between the roof structure and the floor structure and being transversally spaced apart from one another, each one of the sidewalls having a lower edge region; and a pair of elongated floor connectors transversally spaced apart from one another and extending longitudinally along the lower edge region of each one of the sidewalls. Each one of the elongated floor connectors has a floor receiving portion engageable with a respective one of the longitudinal edges of the floor structure and a sidewall receiving portion engageable with a respective one of the lower edge regions of the sidewalls. The roof structure is mechanically connected to the pair of sidewalls.

In an embodiment, there is also provided a motorized vehicle comprising the structural frame as described above.

BRIEF DESCRIPTION OF THE DRAWINGS

FIG. 4 is a left side elevation view of a right sidewall of the structural frame shown in FIG. 1, wherein sheets of the side panels have been removed on one side thereof.

FIG. 5 is a top plan view of the floor structure of the structural frame shown in FIG. 1, with elongated floor slats removed.

FIG. 6 is a top plan view of the floor structure of the structural frame shown in FIG. 1, showing the elongated floor slats.

It will be noted that throughout the appended drawings, like features are identified by like reference numerals.

DETAILED DESCRIPTION

Figure 1:
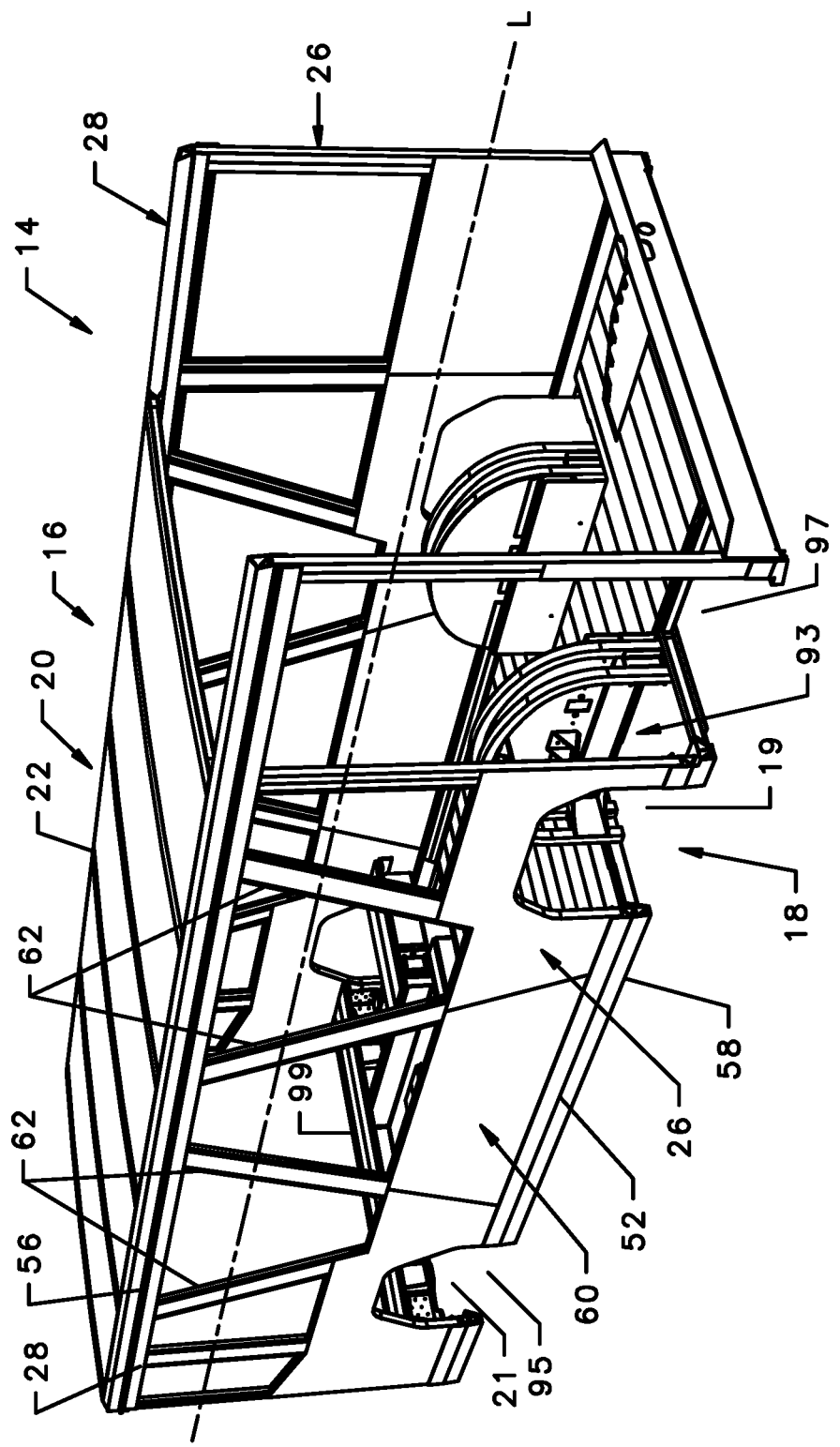
FIG. 1 is a perspective view of a structural frame for a motorized vehicle, according to an embodiment.

Moreover, although the embodiments of the structural frame and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation therebetween, as well as other suitable geometrical configurations, may be used for the structural frame, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward" "left", "right" and the like should, unless otherwise indicated, be taken in the context of the figures and correspond to the position and orientation of the structural frame and corresponding parts, with the "front" corresponding to a position closer to a front of the structural frame, according to a normal travel direction, and the "rear" corresponding to a position closer to a rear of the structural frame, according to the normal travel direction. Positional descriptions should not be considered limiting.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

It will be appreciated that positional descriptions such as "longitudinal" and "transversal" should, unless otherwise indicated, be taken in the context of the figures and correspond to the dimensions of the vehicle, with the "longitudinal" dimension/orientation corresponding to a length of the vehicle or a distance or orientation between the front and the rear of the vehicle, and the "transversal" dimension/orientation corresponding to a track width of the vehicle, orthogonal to the longitudinal orientation. Furthermore, the terms "internally" and "inwardly" are intended to mean towards an interior spacing defined by the structural frame while the terms "externally" and "outwardly" are intended to mean externally of the internal spacing.

Referring to FIGS. 1, 2, 3A and 12, there is shown an embodiment of a structural frame 14 for a motorized vehicle 15. The structural frame 14 described in the following description is designed for motorized vehicles such as midibuses, minibuses, buses or small trucks. More specifically, the structural frame 14 is designed for electric buses which generally carry a battery assembly 100 to store energy on board. In an embodiment, the battery assembly 100 of the motorized vehicle 15 is located on a roof of the structural frame 14 and the structural frame 14 should therefore be capable of transferring the weight of the battery assembly 100 from the roof of the vehicle 15 to the wheels throughout the structural frame 14 of the vehicle.

It can be appreciated that such a structural frame and components could be used for other types of motorized vehicles than passenger carrying motorized vehicles.

In the following description, a definition of the vehicle is one that comprises a powertrain including an engine, a transmission, a driveshaft, a differential and a suspension. The vehicle further comprises a structural frame configured to be assembled with the powertrain so as to form the vehicle. The structural frame provides support to multiple vehicle mechanical components, including the front and rear axles, and typically includes a floor structure. As will be described in more details below, in the embodiment described, in addition to the floor structure, the structural frame includes a roof structure and first and second sidewalls.

Figure 2:
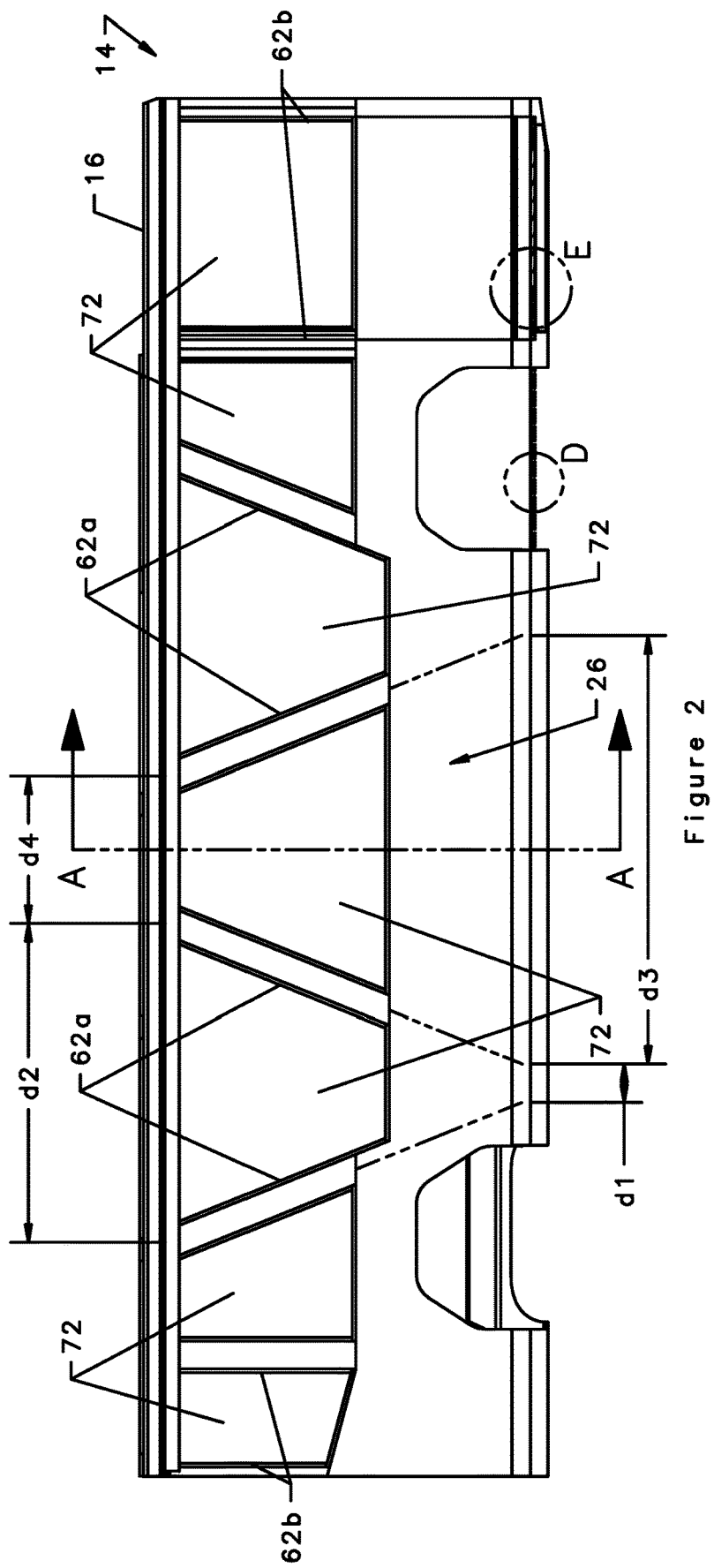
FIG. 2 is a left side elevation view of the structural frame shown in FIG. 1.

In the embodiment shown on FIGS. 1 to 3, the structural frame 14 has a longitudinal axis L. The structural frame 14 includes a roof structure 16 extending along the longitudinal axis L and a floor structure 18 vertically spaced apart from the roof structure 16. As further described below, the structural frame 14 includes a pair of first and second sidewalls 26 extending substantially parallel to the longitudinal axis L, between the roof structure 16 and the floor structure 18 and being transversally spaced apart from one another. The pair of first and second sidewalls 26 are mechanically connected to and supported by the floor structure 18, as will be described in more details below. The roof structure 16 is mechanically connected to the pair of first and second sidewalls 26 and its weight is transferred to the floor structure 18 at least through the pair of sidewalls 26, as will be described in more details below. Thus, each one of the side walls 26 has a longitudinally extending upper edge region 56, proximal to the roof structure 16, and an opposed and longitudinally extending lower edge region 58, proximal to the floor structure.

The structural frame 14 further includes a pair of elongated roof connectors 28 transversally spaced apart from one another, each one being associated and connected to a respective one of the sidewalls 26. The elongated roof connectors 28 extend longitudinally and support the roof structure 16 by engaging the sidewalls 26. More particularly, each one of the elongated roof connectors 28 extend longitudinally along the upper edge region 56 of a respective one of the sidewalls 26. The elongated roof connectors 28 and their mechanical connection with the roof structure 16 and the sidewalls 26, will be described in further details below.

In the embodiment shown, the roof structure 16 includes multiple roof panels 20 and roof beams 22 extending transversally along the width of the vehicle, i.e. along a transversal axis of the structural frame 14. Each one of the roof panels 20 has a pair of opposed transversal edges 24 and are disposed slightly spaced apart from one another so as to receive a respective one of the roof beams 22 therebetween. Thus, the roof panels 20 are configured in a transversally-extending and adjacent configuration with a respective one of the roof beams 22 extending transversally in between.

Figure 12:
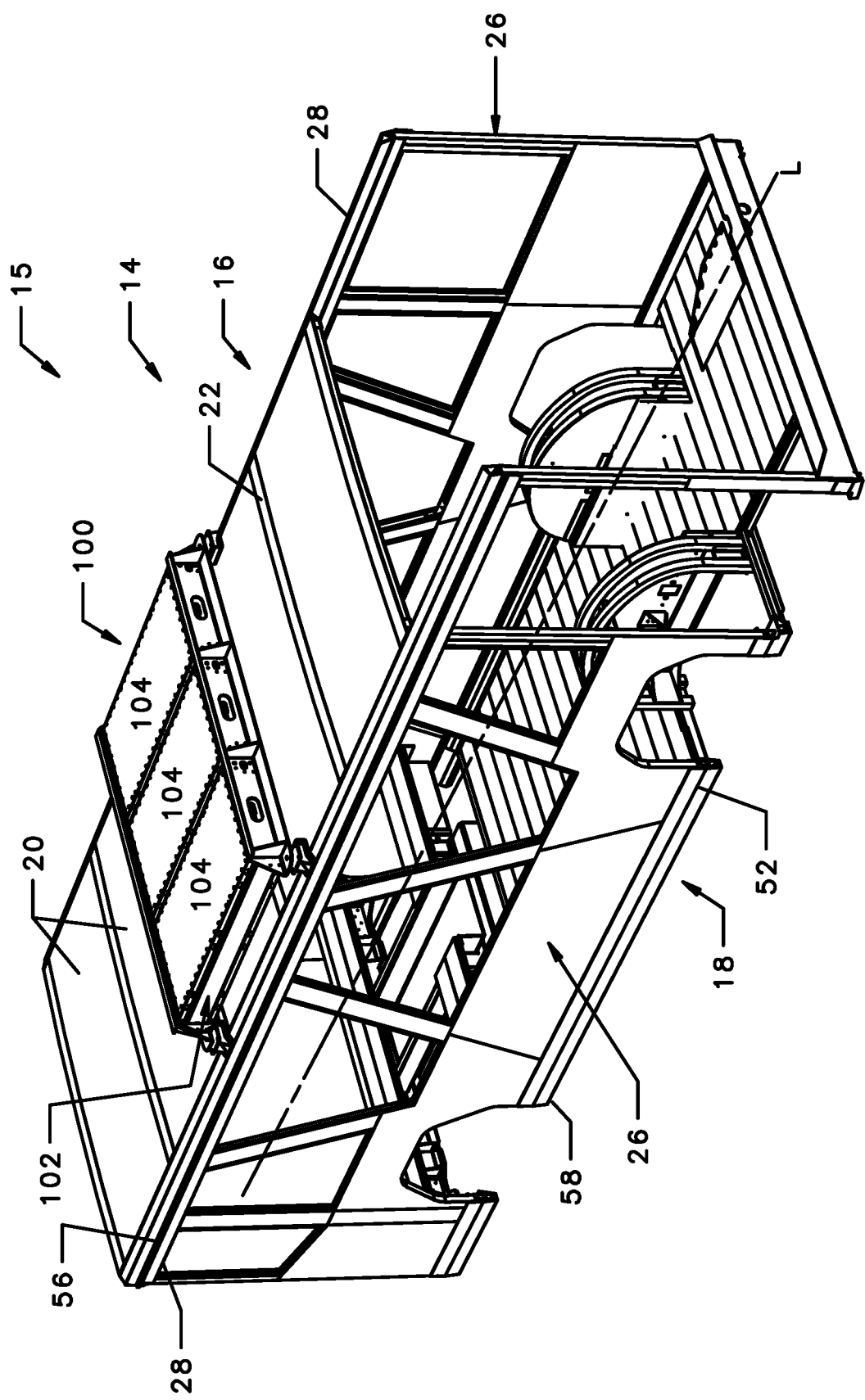
FIG. 12 is a perspective view of a vehicle comprising the structural frame of FIG. 1, the vehicle further comprising a battery assembly mounted to the roof structure of the structural frame.
Figure 13A:
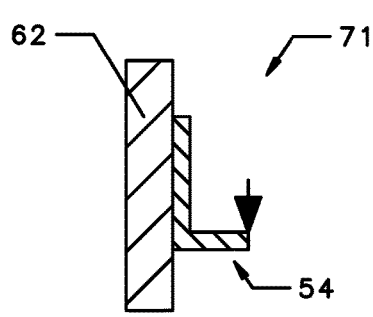
FIGS. 13A to 13E are sectional views of different embodiments of bonding interfaces between one of the side panels and one of the structural frame members.
Figure 13B:
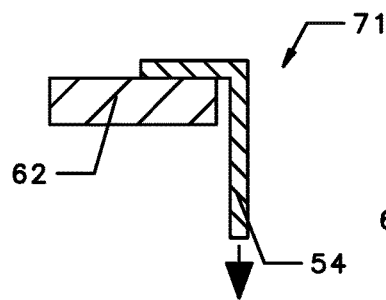
Figure 13C:
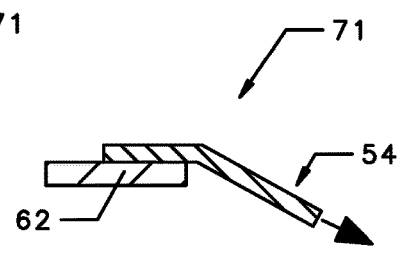
Figure 13D:
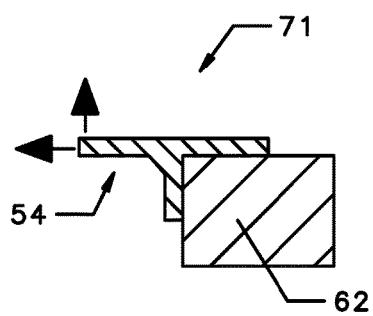
Figure 13E:
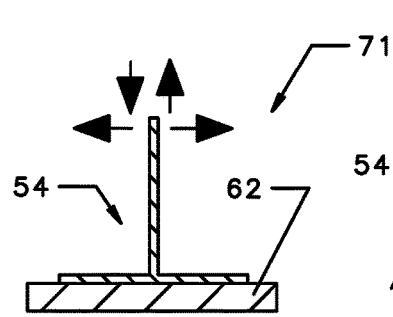
Figure 13F:
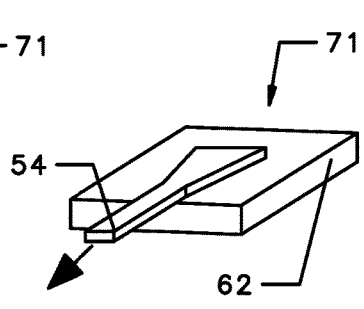
FIG. 13F is perspective view of another embodiment of a bonding interface between one of the side panels and one of the structural frame members.

In the embodiment shown, in reference to FIG. 12, the battery assembly 100 comprises a battery (or energy supply) support 102 mounted to and supported by the roof structure 16. In the embodiment shown, the battery support 102 extends transversally along the width of the structural frame 14, and is mounted to the elongated roof connectors 28. In the embodiment shown, the battery assembly 100 is mounted to a central section of the roof structure 16. It should however be understood that the battery assembly 100 could be mounted elsewhere to the roof structure 16. The vehicle 15 might further comprise additional battery assemblies (not represented) mounted to other locations of the structural frame 14 (not necessarily to the roof structure 16 of the structural frame 14). Furthermore, it can include a plurality of battery (or energy supply) supports which can differ from the embodiment shown.

The battery support 102 comprises a battery receiving chamber in which a plurality of battery packs 104 can be received.

As will be described in more details below, in reference to FIG. 3, the structural frame 14 also includes a pair of elongated floor connectors 52 to engage and connect the sidewalls to the floor structure 18. The elongated floor connectors 52 are transversally spaced apart from one another, each one being associated with and connected to a respective one of the sidewalls 26. The elongated floor connectors 52 extend longitudinally and support a respective one of the sidewalls 26 and engage the floor structure 18. More particularly, each one of the elongated floor connectors 52 extend longitudinally along the lower edge region of a respective one of the sidewalls 26. The elongated floor connectors 52 and their mechanical connection with the floor structure 18 and the sidewalls 26, will be described in further details below.

Figure 8:
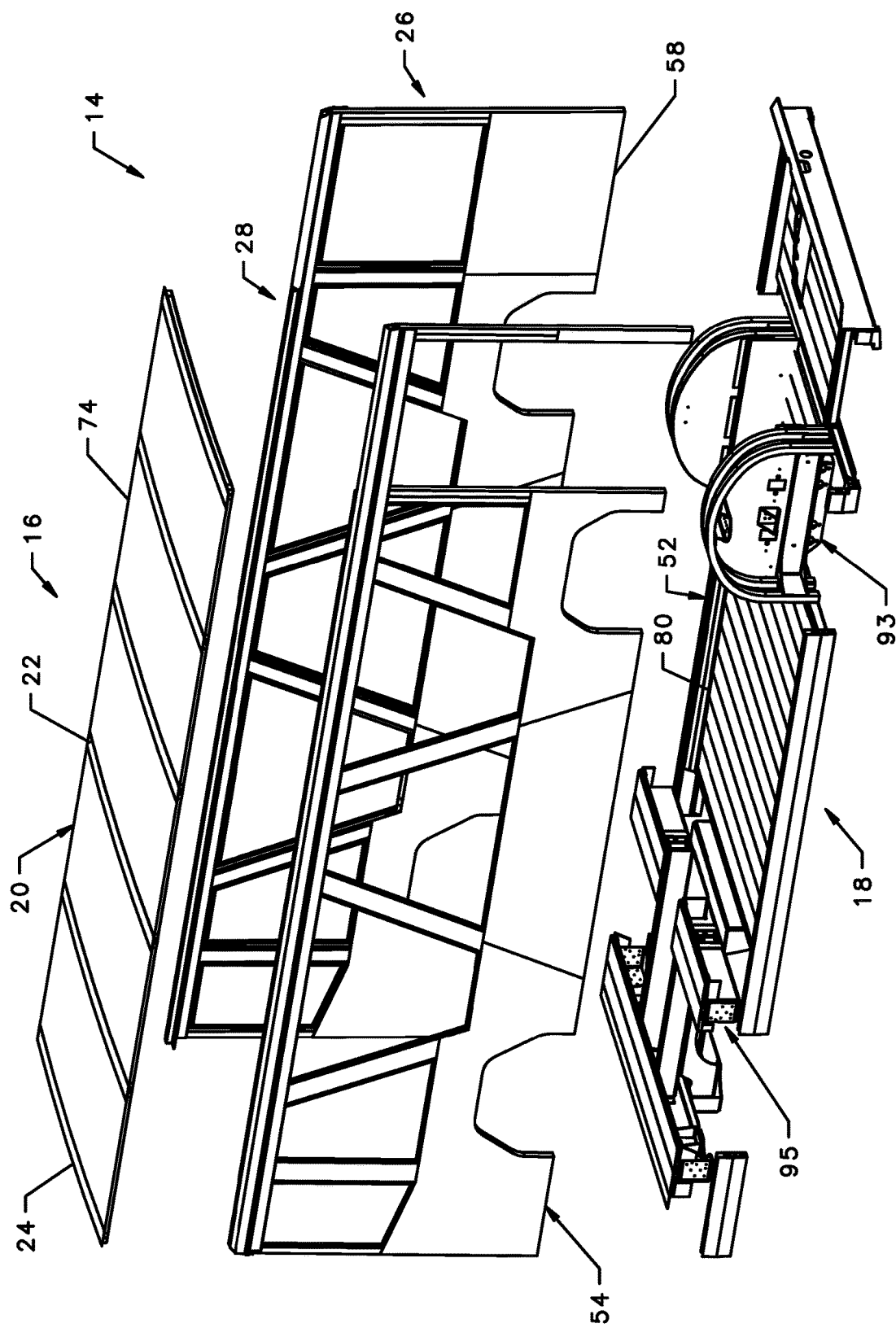
FIG. 8 is an exploded view of the structural frame shown in FIG. 1.

Referring to FIG. 8, there is shown that the structural frame 14 further comprises a front axle supporting assembly 93 and a rear axle supporting assembly 95 mounted to the floor structure 18, the rear axle supporting assembly 95 being spaced apart longitudinally from the front axle supporting assembly 93.

Now referring to FIGS. 4 and 8, each one of the first and second sidewalls 26 has a central section 60 longitudinally extending between the front and the rear axle supporting assemblies 93, 95.

Each one of the first and second sidewalls 26 has a length, considered along the longitudinal axis L of the structural frame 14. In an embodiment, the length of the first and second sidewalls 26 is comprised between about 5000 mm and about 14000 mm. In another embodiment, the length of the first and second sidewalls 26 is comprised between about 6000 mm and about 12500 mm. In another embodiment, the length of the first and second sidewalls 26 is comprised between about 8000 mm and about 10500 mm. In another embodiment, the length of the first and second sidewalls 26 is comprised between about 8500 mm and about 9500 mm In an embodiment, the central section 60 of the first and second sidewalls 26 extends, considered along the longitudinal axis L of the structural frame 14, along between about 1500 mm and about 6500 mm. In another embodiment, the central section 60 of the first and second sidewalls 26 extends, considered along the longitudinal axis L of the structural frame 14, along between about 3000 mm and about 4500 mm. In another embodiment, the central section 60 of the first and second sidewalls 26 extends, considered along the longitudinal axis L of the structural frame 14, along between about 3500 mm and about 4000 mm.

In an embodiment, the central section 60 of the first and second sidewalls 26 extend along between about 35% and about 60% of the length of the corresponding sidewall 26. In another embodiment, the central section 60 of the first and second sidewalls 26 extend along between about 40% and about 55% of the length of the corresponding sidewall 26. In an embodiment, the vehicle has a length, which is slightly longer than the length of the sidewalls 26, between about 28 feet to about 44 feet (about 8.5 meters to 13.5 meters). In a particular embodiment, for midibus, the vehicle length is between about 8.5 meters to about 9.5 meters Each one of the sidewalls 26 comprises a plurality of structural frame members 62 extending between the upper edge region 56 and the lower edge region 58 and a plurality of side panels 54 covering at least partially the structural frame members 62. Therefore, the roof structure 16 is mechanically connected to the pair of sidewalls 26 and the weight of the roof structure 16 as well as the weight of the battery assembly 100 mounted thereto are transferred to the floor structure 18 at least through the structural frame members 62.

In an embodiment, the first and second sidewalls 26 of the structural frame 14 are configured to support a weight up to about 1000 kg. In another embodiment, the first and second sidewalls 26 of the structural frame 14 are configured to support a weight up to about 2000 kg. In yet another embodiment, the first and second sidewalls 26 of the structural frame 14 are configured to support a weight up to about 3000 kg.

It is understood that the weight supported by the first and second sidewalls 26 is not limited to the weight of the roof structure 16, but also comprises the weight of the battery assembly 100, as well as the weight of additional elements supported by the roof structure 16, such as snow, pieces of luggage or any other element that could be received on an upper surface of the roof structure 16.

In an embodiment, the first and second sidewalls 26 are configured to transfer to the floor structure 18 between about 50% and about 90% of the weight of the roof structure 16 with the battery assembly 100 mounted thereto. In another embodiment, the first and second sidewalls 26 are configured to transfer to the floor structure 18 between about 60% and about 80% of the weight of the roof structure 16 with the battery assembly 100 mounted thereto.

In the central section 60, a plurality of the structural frame members 62a extends substantially diagonally between the upper edge region 56 and the lower edge region 58. Therefore, at least a portion of the weight of the roof structure 16 and the battery assembly 100 mounted thereto is transferred to the floor structure 18 through the diagonally-extending structural frame members 62a.

In an embodiment, the plurality of diagonally-extending structural frame members 62a is disposed in pairs. At least some of the pairs are angled in opposed directions with lower ends of the diagonally-extending frame members 62a being closer to one another than opposed upper ends of the diagonally-extending frame members 62a. In some embodiments, the distance d1, as represented in FIG. 2, considered along the longitudinal axis L, between the lower ends of the diagonally-extending structural frame members 62a of at least one of the pairs is comprised between about 30 mm and about 60 mm. In some embodiments, the distance d1 between the lower ends of the diagonally-extending structural frame members 62a of at least one of the pairs is comprised between about 40 mm and 50 mm. In some embodiments, the distance d2, as represented in FIG. 2, considered along the longitudinal axis L, between the upper ends of the diagonally-extending structural frame members 62a of at least one of the pairs is comprised between about 1000 mm and about 2500 mm. In some embodiments, the distance between the upper ends of the diagonally-extending structural frame members 62a of at least one of the pairs is comprised between about 1300 mm and about 1900 mm.

It is thus understood that, in an embodiment, the distance, considered along the longitudinal axis L, between any longitudinal position of at least two consecutive diagonally-extending structural frame members 62a is comprised between about 30 mm and about 2500 mm. In another embodiment, the distance, considered along the longitudinal axis L, between any longitudinal position of at least two consecutive diagonally-extending structural frame members 62a is comprised between about 100 mm and about 2000 mm. In yet another embodiment, the distance, considered along the longitudinal axis L, between any longitudinal position of at least two consecutive diagonally-extending structural frame members 62a is comprised between about 600 mm and about 1600 mm.

In an embodiment, the diagonally-extending frame members 62a of at least one of the pairs are arranged so as to define a plane of symmetry extending substantially transversally relative to the longitudinal axis L. In an embodiment, the plane of symmetry extends substantially vertically.

In an embodiment, the distance d3, as represented in FIG. 2, considered along the longitudinal axis L, between the lower ends of at least two consecutive pairs of diagonally-extending structural frame members 62a is comprised between about 1500 mm and about 2500 mm. In another embodiment, the distance d3 between the lower ends of at least two consecutive pairs of diagonally-extending structural frame members 62a is comprised between about 1900 mm and 2200 mm. In an embodiment, the distance d4, as represented in FIG. 2, considered along the longitudinal axis L, between the upper ends of at least two consecutive pairs of diagonally-extending structural frame members 62a is comprised between about 300 mm and about 1000 mm. In another embodiment, the distance d4 between the upper ends of at least two consecutive pairs of diagonally-extending structural frame members 62a is comprised between about 500 mm and about 700 mm.

In another embodiment, at least a plurality of the diagonally-extending structural frame members 62a extends between the upper edge region 56 and the lower edge region 58 at an angle ranging between about 55 degrees and about 85 degrees with respect to a horizontal axis.

In another embodiment, at least a plurality of the diagonally-extending structural frame members 62a extends between the upper edge region 56 and the lower edge region 58 at an angle ranging between about 65 degrees and about 75 degrees with respect to a horizontal axis.

In the embodiment shown, referring to FIG. 2, each one of the first and second sidewalls 26 comprises at least two pairs of diagonally-extending structural frame members 62a, the at least two pairs being arranged so as to define a plane of symmetry substantially transversal to the longitudinal axis L. In the embodiment shown, the plane of symmetry defined between the at least two pairs of diagonally-extending structural frame members 62a is substantially vertical and comprises the cross-section lines A-A represented in FIG. 2.

In the embodiment shown, referring to FIGS. 1 and 12, the configuration of the diagonally-extending structural frame members 62a of the first and second sidewalls 26 are substantially similar; in other words, in the embodiment shown, the first and second sidewalls 26 have diagonally-extending structural frame members 62a that are arranged so as to define a plane of symmetry between the first and second sidewalls 26. In the embodiment shown, the plane of symmetry defined between the first and second sidewalls 26 is substantially vertical and extends substantially parallel to the longitudinal axis L. It is understood that, in the embodiment shown, the diagonally-extending structural frame members 62a of the first and second sidewalls 26 are arranged so as to define two substantially vertical planes of symmetry. In the embodiment shown, the planes of symmetry extend substantially perpendicular to each other.

It is to be noted that the diagonally-extending structural frame members 62a of the first and second sidewalls 26 provide a better transfer of the weight supported by the roof structure 16 to the floor structure 18 compared with a structural frame having sidewalls comprising only vertically-extending structural frame members, so that it might not be necessary to further provide the structural frame 14 with additional reinforcements. It is thus understood that the structural frame 14 according to the present disclosure might comprise window and/or door enclosures having greater dimensions compared with a structural frame having diagonally-extending reinforcements, thus increasing the comfort of the users to be transported by the vehicle comprising the structural frame 14 according to the present disclosure.

As a consequence, the structural frame 14 according to the present disclosure provides a better transfer of the weight supported by the roof structure 16 having diagonally-extending structural frame members 62a compared with a structural frame having sidewalls comprising only vertically-extending structural frame members. It is to be noted that the roof structure 16 according to the present disclosure also has an improved deformation resistance compared with a structural frame having sidewalls comprising only vertically-extending structural frame members. It has been measured that a sidewall having one diagonally-extending structural frame member has an increased deformation resistance compared with a sidewall having only vertically-extending structural frame members of about 170%. It has further been measured that a sidewall having two pairs of diagonally-extending structural frame members, as represented for instance in FIG. 1, has an increased deformation resistance compared with a sidewall having only vertically-extending structural frame members of about 250%.

In an embodiment, the central section 60 of at least one of the first and second sidewalls 26 is free of vertically-extending structural members 62b.

It can be appreciated that, in an alternative embodiment (not shown), at least some of the structural frame members 62 can extend substantially vertically between the upper edge region 56 and the lower edge region 58 in the central section 60 and/or in the sections extending rearwardly the rear axle supporting assembly 95 or forwardly the front axle supporting assembly 93. In the embodiment shown, the structural frame 14 includes vertically-extending structural members 62b in the sections extending rearwardly the rear axle supporting assembly 95 or forwardly the front axle supporting assembly 93.

Figure 10:
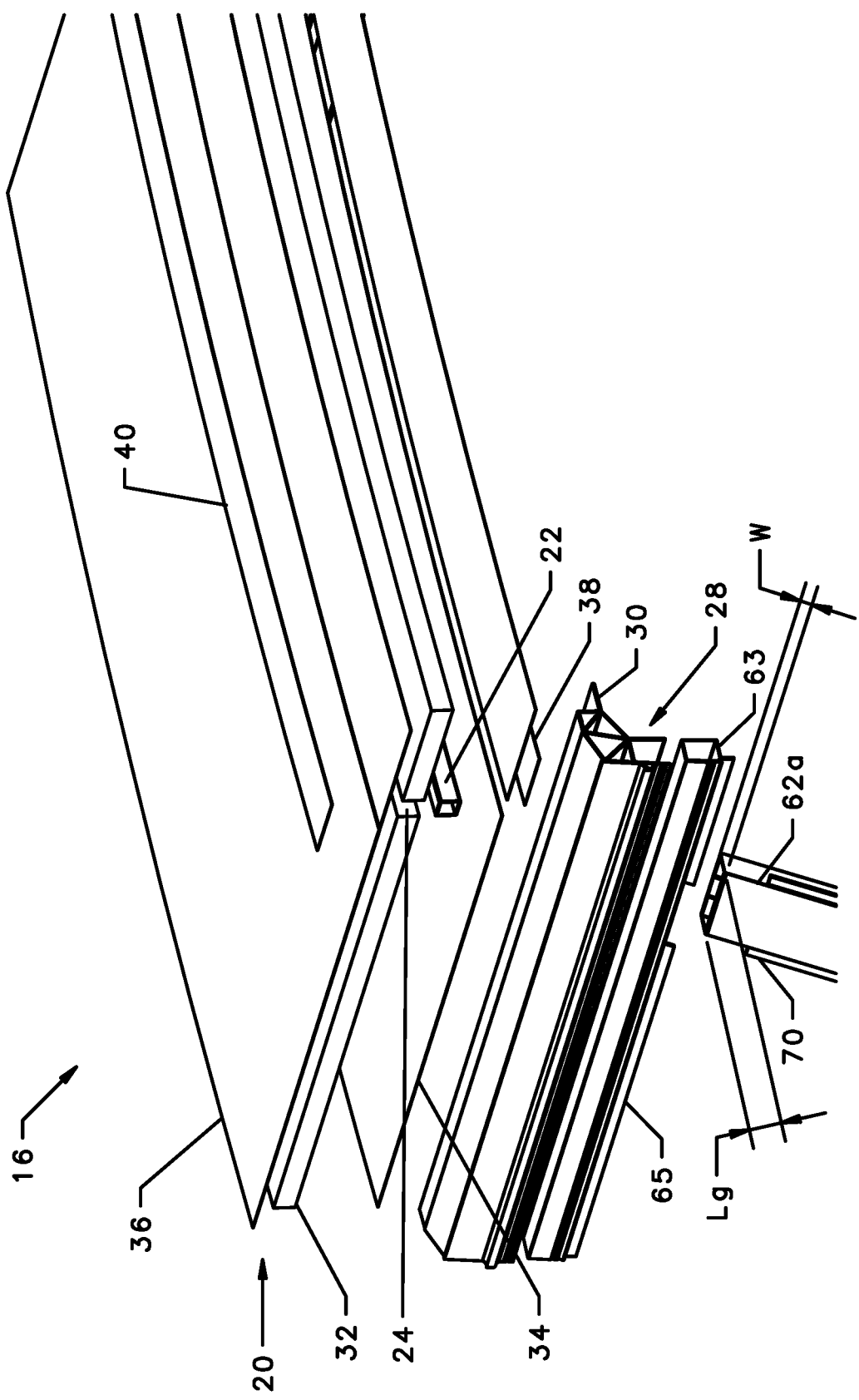
FIG. 10 is an exploded view of a section of the structural frame shown in FIG. 1, showing a portion of the roof structure and elongated roof connectors.

In the embodiment shown on FIG. 10, the structural frame members 62 are metal/alloy extrusions having a rectangular hollow cross section. In an embodiment, the structural frame members 62 are aluminum-based extrusions. It is to be noted that the greater flexibility of aluminum compared to the flexibility of steel (aluminum having a Young's modulus of about 60, whereas steel has a Young's modulus of about 200) might be compensated by the density difference between aluminum and steel, aluminum being approximately about 3 times less dense than steel. In other words, the use of aluminum to form at least some of the structural frame members 62 do not jeopardize the overall rigidity of the structural frame 14. Aluminum could be replaced by other light weight metals or alloys.

In an embodiment, as represented in FIG. 10, the rectangular cross-section of at least one of the structural frame members 62 has a length Lg and a width W, the length Lg being comprised between about 35 mm and about 200 mm, the width W being comprised between about 35 mm and about 75 mm. In another embodiment, the length Lg is comprised between about 100 mm and about 150 mm, and the width W is comprised between about 45 mm and about 65 mm.

In an embodiment, the extrusion of at least one of the structural frame members 62 has a wall with a thickness comprised between about 3 mm and about 8 mm. In another embodiment, the thickness is comprised between about 5 mm and 7 mm. In other words, the wall defines a hollow body of the at least one of the structural frame members 62. In an embodiment, at least one of the diagonally-extending structural frame members 62a comprises a hollow body having a wall. The wall has a thickness comprised between about 3 mm and about 8 mm.

In an embodiment (not represented), the structural frame 14 further comprises lateral reinforcements extending, for instance, in a plane transversal—or substantially perpendicular—to at least one of the first and second sidewalls 26. In some embodiments, the lateral reinforcements are arranged at a front portion and/or at rear portion of the structural frame 14, i.e. between the front axle supporting assembly 93 and a door enclosure 97 of the sidewall 26 and/or between the rear axle supporting assembly 95 and a rear seat receiving support 99 of the floor structure 18.

Figure 9:
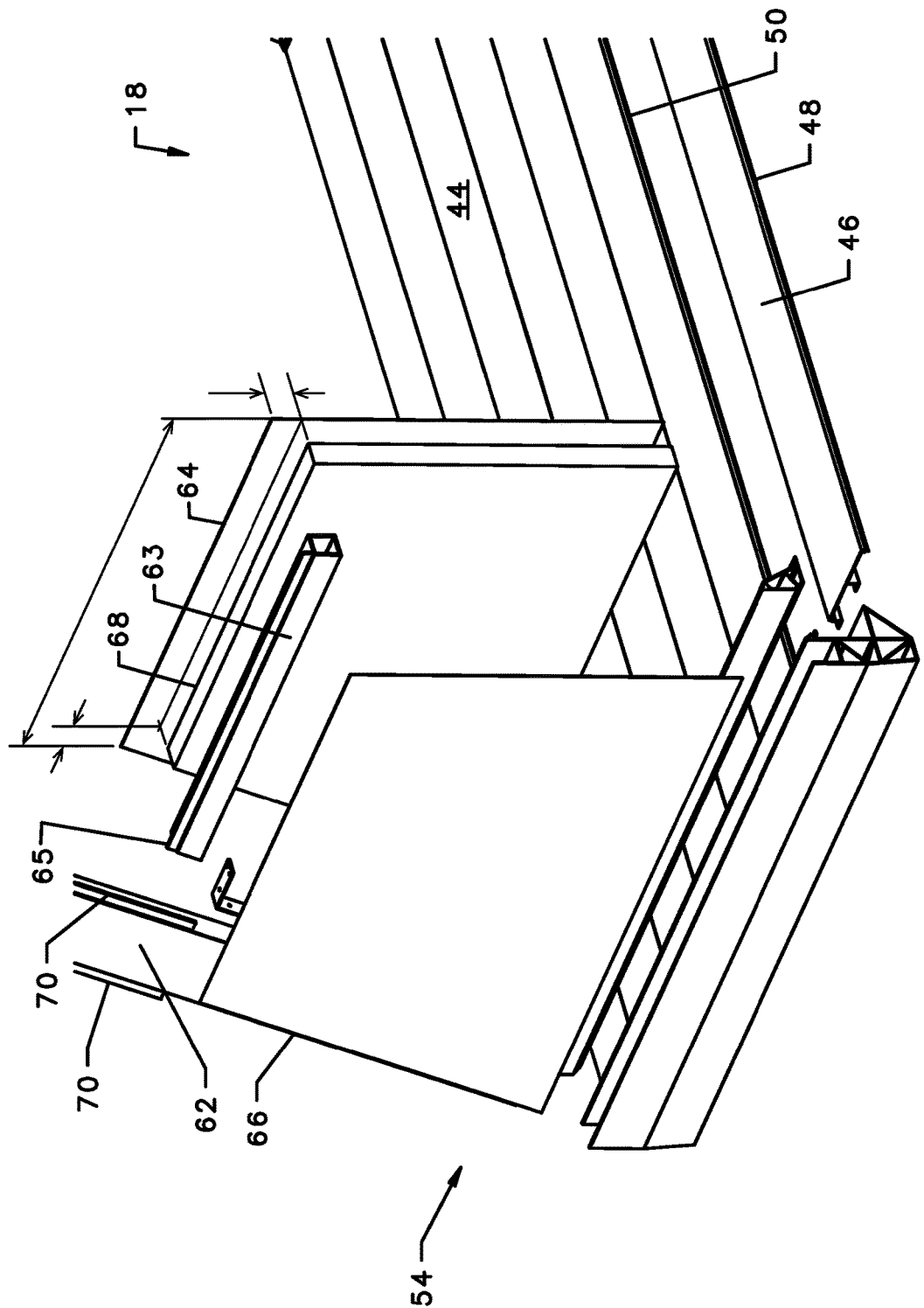
FIG. 9 is an exploded view of a section of the structural frame shown in FIG. 1, showing a portion of the elongated floor slats, the elongated floor connectors and side panels.

As shown on FIGS. 4 and 9, in the embodiment shown, each one of the sidewalls 26 comprises a plurality of side panels 54 extending upwardly from the lower edge region 58 of the sidewall 26 and disposed in a horizontally adjacent configuration. However, it is appreciated that, in an alternative embodiment, each one of the sidewalls 26 can include a single side panel.

The side panels 54 are secured to the structural frame members 62, or structural columns. In the embodiment shown, in the central section 60, each one of the side panels 54 is secured to at least two of the diagonally-extending structural frame members 62a. In an embodiment, the side panels 54 are bonded to the structural frame members 62, using a suitable adhesive, with bonding interfaces 71 being located over a respective one of an inner surface and an outer surface of the structural frame members 62. Bonding along a substantially continuous interface so as to define a bonding surface between the side panels and the structural frame members increases the mechanical properties of the structural frame 14. In other words, the side panels and the structural frame members are bonded to each other along the bonding surface. In addition to the adhesive, mechanical fasteners, such as bolts and rivets, can be used to further secure together the side panels 54 and the structural frame members 62.

As mentioned above, the weight of the roof structure 16 is transferred to the floor structure 18 at least through the structural frame members 62, and in particular at least through the diagonally-extending structural frame members 62a. The use of adhesives over the bonding interfaces 71 results in a load distribution surface larger than with mechanical fasteners or a welding bead contact surface. It is to be noted that the use of adhesives over the bonding interfaces 71 avoids a deterioration of the mechanical properties of the structural frame members 62 that could be induced by mechanical fasteners and/or welding. The use of adhesives is thus particularly interesting in the embodiment in which at least some of the structural frame members 62 are at least partially made of aluminum. In some embodiments, the mechanical properties of the structural frame members 62 bonded to the side panels 54 are increased between about 100% and about 150% compared with the mechanical properties of structural frame members that would be welded to the side panels, considered locally around the welding areas. Moreover, the use of mechanical fasteners might not be adapted to structural frame members having a hollow cross section, since it could incur a distortion of the structural frame members; mechanical fasteners further require a significant space to cooperate with the elements to be secured together.

FIGS. 13A to 13F represent different embodiments of the bonding interfaces 71 between the side panels 54 and the structural frame members 62. As apparent from the different figures, it is to be understood that the shapes, dimensions and arrangements of the cooperation between the side panels 54 and the structural frame members 62 are configured to maximize the surface of the bonding interfaces 71, in order to ensure an efficient distribution of the constraints between the side panels 54 and the structural frame members 62. It is to be noted that the bonding interfaces 71 have greater surfaces compared with welding bead contact surfaces. The cooperation between the different elements is also designed so as to limit the constraints that could generate cleavage at the bonding interfaces 71.

Thus, it can be appreciated that the loads to be transferred from the roof structure 16, with the battery assembly 100 mounted thereto, due to its weight, to the floor structure 18 are uniformly distributed over the bonding interfaces 71, with less stress concentration than with single-point assembly methods. In an embodiment, the side panels 54 are secured to the structural frame members 62 using a combination of adhesives and rivets.

Still referring to FIG. 9, each side panel 54 comprises an inner sheet 64, an outer sheet 66, and a lightweight core panel 68 sandwiched between the inner sheet 64 and the outer sheet 66. In an embodiment, the inner sheet 64 and the outer sheet 66 are bonded to the inner and outer surfaces of the core panel 68 using adhesives. In an embodiment, the core panel 68 comprises a polymeric foam material, but it can be appreciated that any material having heat and/or noise insulating and/or structural properties, such as, and without being limitative, aluminum or polymeric honeycomb or Styrofoam, may be used. The inner and outer sheets can be aluminum sheet but other suitable and relatively low-weight metal, alloy or polymer may be used. In an embodiment, the core panel 68 is discontinuous and sections of the inner sheet 64 and the outer sheet extend past the core panel 68 to abut against and be bonded to the inner and outer surfaces of the structural frame members 62.

In an upper section thereof, above the side panels 54, each one of the structural frame members 62 is provided on at least a longitudinally extending portion with a pair of flanges 70 extending outwardly on each lateral side thereof and substantially parallel to and aligned with the outer surface of the frame member 62. In the embodiment shown, the sidewalls 26 further comprise upper and lower window beams 63. In the embodiment shown, the window beams 63 include metal extrusions, such as aluminum-based extrusions, having a square hollow cross section and a flange 65 extending longitudinally along the window beam and outwardly and substantially aligned with and parallel to the outer wall of the window beam. In an embodiment, the flanges 70 of the structural frame members 62 connect to the upper window beams at a top end and abut against the lower window beams 63 at a lower end. In an embodiment, the structural frame members 62 are disposed to define, with the upper and lower window beams 63, window enclosures 72. The window beams 63 are configured to receive window panes (not shown), at an interface formed by inner surfaces of the flanges 65 and the window beam 63. The window enclosures 72 extend above the side panels 54 and below the elongated roof connectors 28. In the central portion 60, the window enclosures 72 are trapezoidal in shape since they are at least partially defined by the diagonally extending structural members 62*a*.

Figure 3A:
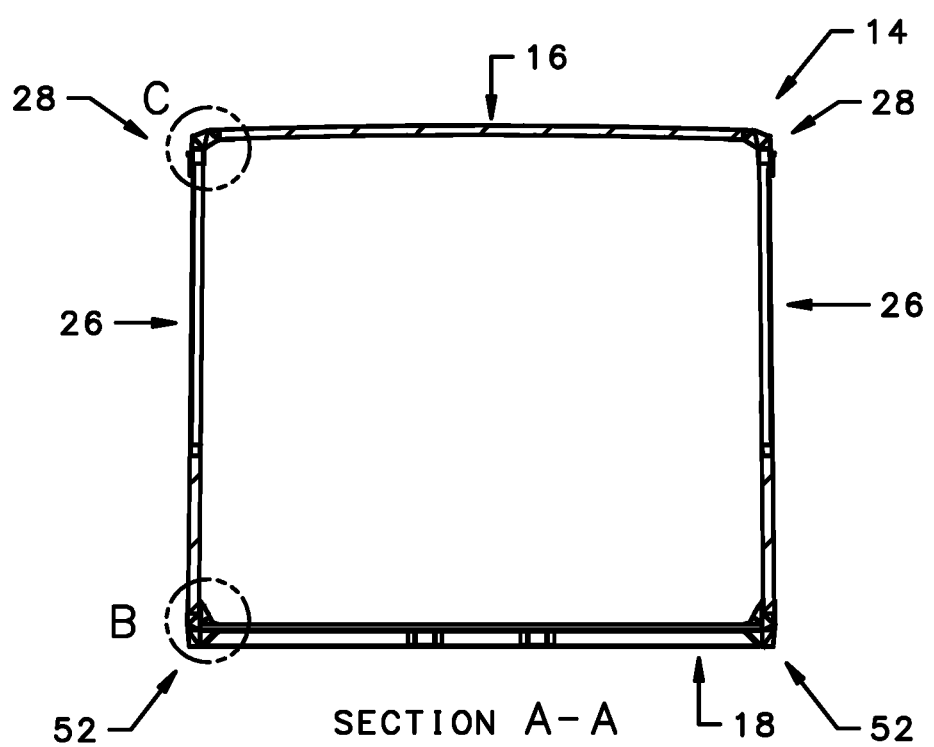
FIG. 3A is a sectional view taken along cross-section lines A-A of FIG. 2 of the structural frame.
Figure 3B:
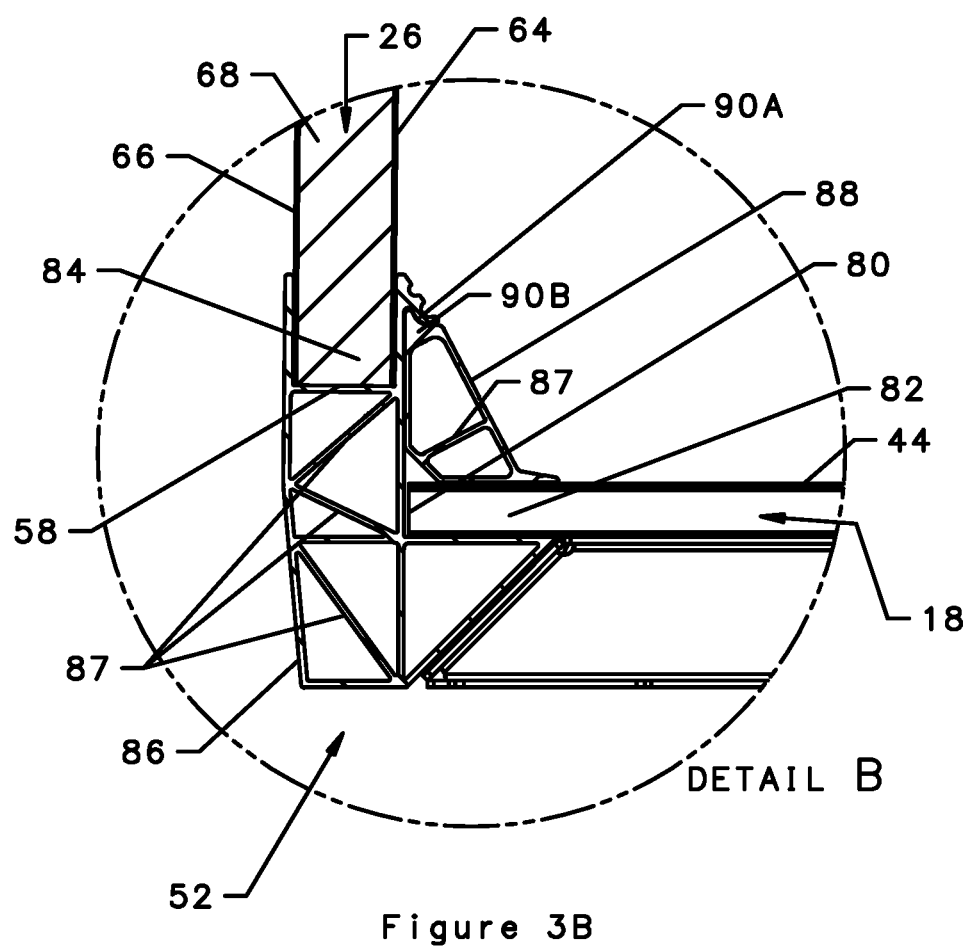
FIG. 3B is an enlarged view of a section of the structural frame shown in FIG. 3A, showing a portion of elongated floor connectors, sidewalls and floor structure.
Figure 11:
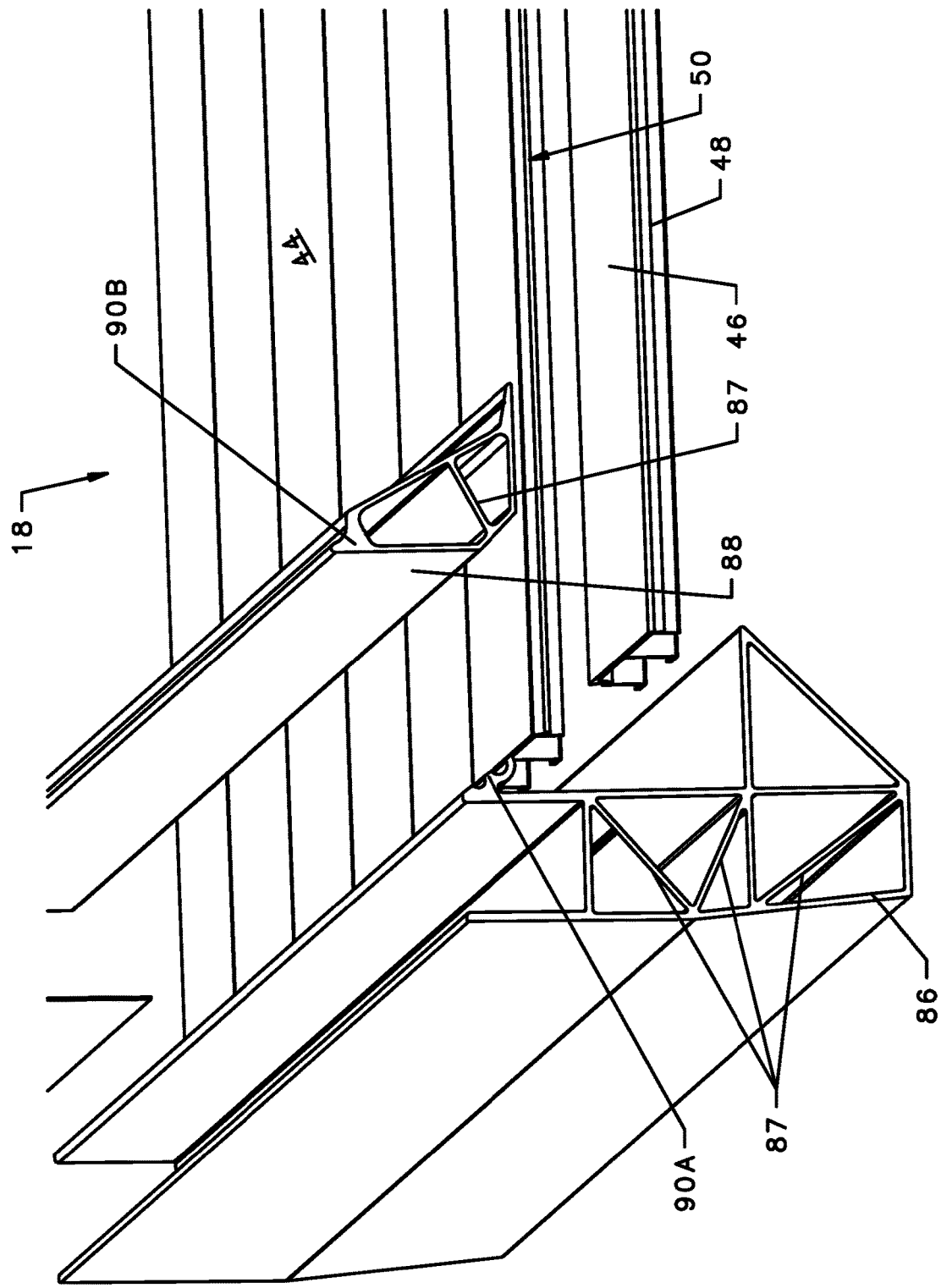
FIG. 11 is an exploded view of a section of the structural frame shown in FIG. 1, showing a portion of the elongated floor slats and elongated floor connectors.

Now referring to FIGS. 3B, 8 and 11, there is shown an embodiment of elongated floor connectors 52 that extend longitudinally along the lower edge region 58 of a respective one of the sidewalls 26. In the embodiment shown, each one of the elongated floor connectors 52 comprises a main connector 86 and a corner abutment 88. In the embodiment shown, each one of the main connector 86 and the corner abutment 88 is an extrusion, such as and without being limitative an aluminum-based extrusion, having an inner wall and an outer wall, spaced-apart from one another and connected to one another by a plurality of reinforcing web members 87. The main connector 86 has a substantially L-shaped cross-section with a sidewall receiving portion 84 defined in an upper portion and a floor receiving portion 82 extending inwardly. In the embodiment shown, the sidewall receiving portion 84 is a side wall receiving recess defined by upper sections of the inner and outer walls. The floor structure 18, along a respective one of longitudinal edges 80, abuts against and is supported by the floor receiving portion 82. A respective one of the lower edge regions 58 of the sidewalls 26 is received in the sidewall receiving portion 84.

The corner abutment 88 abuts against an upper surface 44 of the floor structure 18 and an inner wall of the main connector 86. The corner abutment 88 applies pressure on the floor structure 18, along the respective one of longitudinal edges 80 and maintains the floor structure 18 in contact with the floor receiving portion 82 of the main connector 86.

In the embodiment, the main connector 86 and the corner abutment 88 include complementary interlocking members 90A, 90B. The interlocking member 90A of the main connector 86 protrudes inwardly and downwardly from an upper edge region of the inner wall. In the embodiment shown, the interlocking member 90A is curve-shaped and defines a substantially triangular recess with an outer surface of the inner wall of the main connector 86. The interlocking member 90B of the corner abutment 88 includes a curved recess defined in an upper portion thereof. The upper portion of the corner abutment 88 is complementary in shape with the recess defined between surface of the inner wall of the main connector 86 and the interlocking member 90A. The upper portion of the corner abutment 88 is inserted and received within the recess defined between surface of the inner wall of the main connector 86 with the interlocking member 90A being seated in the curved recess defined in the upper portion of the corner abutment 88. Thus, engagement of the complementary interlocking members 90A, 90B maintain the corner abutment 88 in an engaged configuration wherein it applies pressure on the floor structure 18, along the respective one of longitudinal edges 80 and maintains the floor structure 18 in contact with the floor receiving portion 82 of the main connector 86.

Figure 3C:
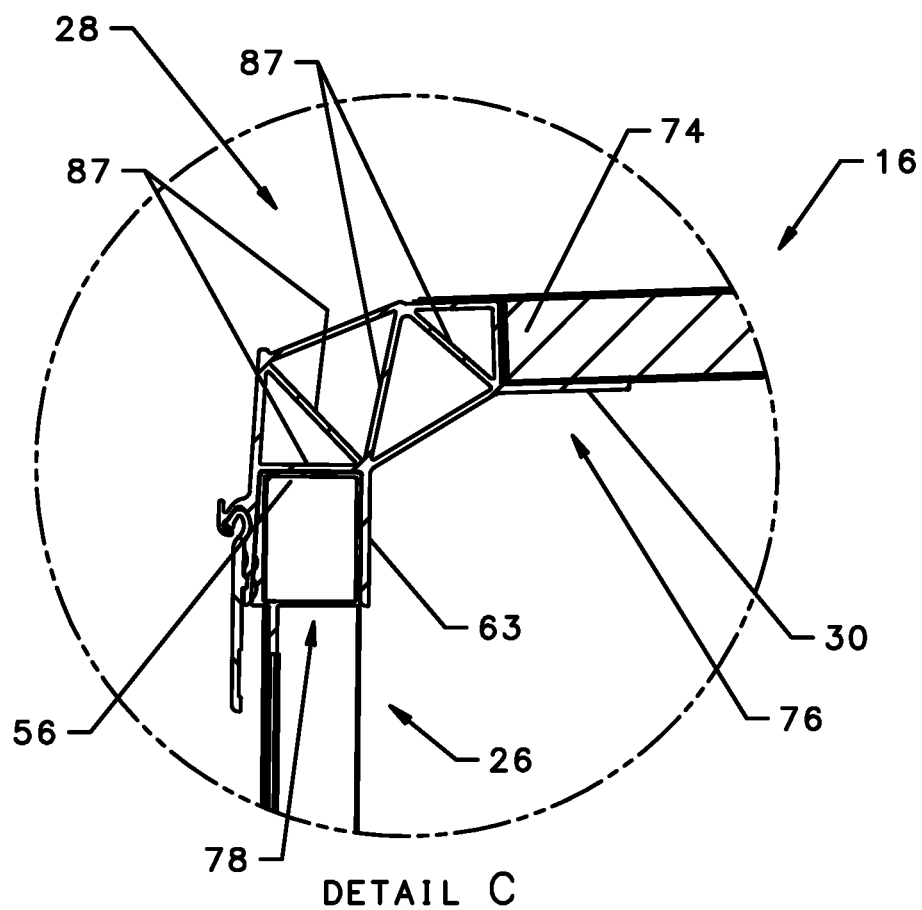
FIG. 3C is an enlarged view of a section of the structural frame shown in FIG. 3A, showing a portion of elongated roof connectors, sidewalls and roof structure.

Now referring to FIGS. 3C, 8 and 10, there is shown an embodiment of the elongated roof connectors 28 which extends longitudinally along the upper edge region 56 of a respective one of the sidewalls 26.

In the embodiment shown, each one of the elongated roof connectors 28 is an extrusion, such as and without being limitative an aluminum-based extrusion, having an inner wall and an outer wall, spaced-apart from one another and connected to one another by a plurality of reinforcing web members 87. The elongated roof connectors 28 has a substantially L-shaped cross-section with a roof receiving portion 76 defined in a substantially horizontally-extending section and a sidewall receiving portion 78 defined in a substantially vertically-extending section. The roof structure 16, along a respective one of the longitudinal edges 74, is engageable with the roof receiving portion 76 and the sidewalls, along a respective one of the upper edge regions 56, is engageable with the sidewall receiving portion 78. In an embodiment shown, each one of the sidewall receiving portions 78 is a side wall receiving recess defined between the inner and outer walls. Thus, a respective one of the upper edge regions 56 of the sidewalls 26 is received in the sidewall receiving portion 78. In the embodiment shown, the upper window beams 63 of the sidewalls 26 are engageable with the sidewall receiving portion 78. The outer surface of the upper window beam 63 comprises a series of elongated ribs (or protrusion) and elongated recesses to engage complementary elongated ribs (or protrusion) and elongated recesses defined on an inner surface of an outer wall of the sidewall receiving portion 78. The flanges 65 of the upper window beams are discontinuous and include indentations to receive the upper ends of the structural frame members 62. The structural frame members 62 thus engage with the window beams 63 and the flanges 70 of the structural frame members abut against the window beam flanges 65. In the embodiment shown, each window enclosure 72 is thus defined above the side panels 54 and below the elongated roof connectors 28 by a pair of window beams 63 (upper and lower) and adjacent ones of the structural frame members 62.

In the embodiment shown, each one of the roof receiving portions 76 comprises a flange 30 extending inwardly from the inner wall of the elongated roof connector 28, i.e. the flange 30 is a substantially horizontal extension of the inner wall of the elongated roof connector 28. The roof structure 16, along a respective one of the longitudinal edges 74, abuts, rests, and is supported by the flange 30 of the roof receiving portion 76. More particularly, the roof beams 22 of the roof structure 16 abut against the flange 30 of the roof receiving portion 76.

The elongated roof connectors 28 transfer the weight of the roof structure 16, which can additionally comprise the weight of the battery assembly 100, to the sidewalls 26.

Figure 7:
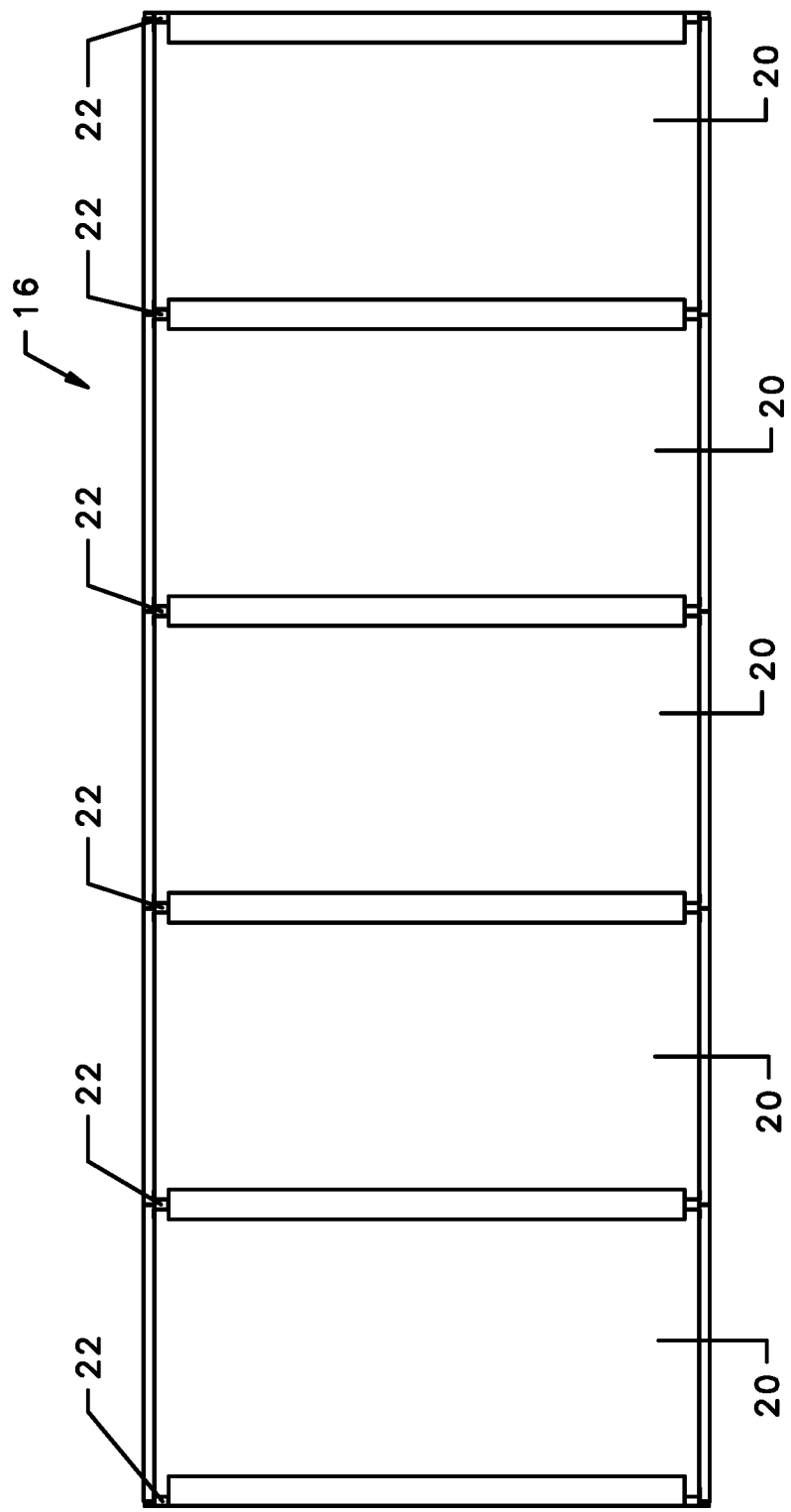
FIG. 7 is a bottom plan view of the roof structure of the structural frame shown in FIG. 1.

Now referring to FIGS. 7 and 10, as mentioned above, at opposite transversal ends thereof, the roof beams 22 of the roof structure 16 abut against the flange 30 of the elongated roof connectors 28. As shown on FIG. 10, in the embodiment shown, the roof panels 20 comprise a sandwich structure that includes a lightweight core panel 32, an inner sheet 34 and an outer sheet 36 bonded to the inner and outer surfaces of the core panel 32. The sheets 34, 36 and the core panel 32 can be bonded to one another with an adhesive. In a non-limitative embodiment, the core panel 32 comprises a polymeric foam material, but it can be appreciated that any material having insulating and/or structural properties may be used. The inner and outer sheets can be aluminum-based sheet but other suitable and relatively low-weight metal, alloy or polymer may be used. In a non-limitative embodiment, the roof beams 22 of the roof structure 16 can be aluminum-based extrusions.

In the illustrated embodiment of FIG. 10, the roof beams 22 have a rectangular hollow cross-section of standard dimensions, but it can be appreciated that other cross-section geometries may work.

In the embodiment shown, the roof structure 16 comprises a plurality of adjacent roof panels with a respective one of the roof beams 22 extending inbetween. In the embodiment shown, the roof beams 22 extend between two adjacent ones of the core panels 32 of the roof structures. The roof beams 22 are fully covered externally and partially covered internally by adjacent ones of the outer and inner sheets 36, 34. In the embodiment shown, the roof structure 16 further includes inner plates 38 and outer plates 40 covering the junction, or space, between adjacent ones of the inner and outer sheets 34, 36. The inner and outer plates 38, 40 can be metal plates bonded to respective ones of the inner and outer sheets 34, 36, above and below sheet junctions or ends, to cover, seal, and hide same.

Now referring to FIGS. 6 and 9, an embodiment of the floor structure 18, that is vertically spaced apart from the roof structure 16, will be described. The floor structure 18 has an upper floor surface 44 extending longitudinally which is defined by a plurality of elongated floor slats 46 that extends substantially perpendicular to the longitudinal axis L.

Referring to FIG. 9, it is shown that each one of the elongated floor slats 46 comprises two opposed transversal edges 48. Each one of the transversal edges 48 has an interlocking joint 50 extending along a length of the transversal edge 48. The elongated floor slats 46 are configured such that an interlocking joint 50 of a first transversal edge 48 of a first elongated floor slat 46 is engageable with an interlocking joint 50 of a second transversal edge 48 of a second elongated floor slat 46 in order to engage together adjacent elongated floor slats 46 and form the upper and longitudinally extending floor surface 44. The elongated floor slats 46 can be metallic extrusions, such as and without being limitative aluminum-based extrusions. It can be appreciated that elongated floor slats, manufactured using other methods than extrusion, could be used.

Figure 3D:
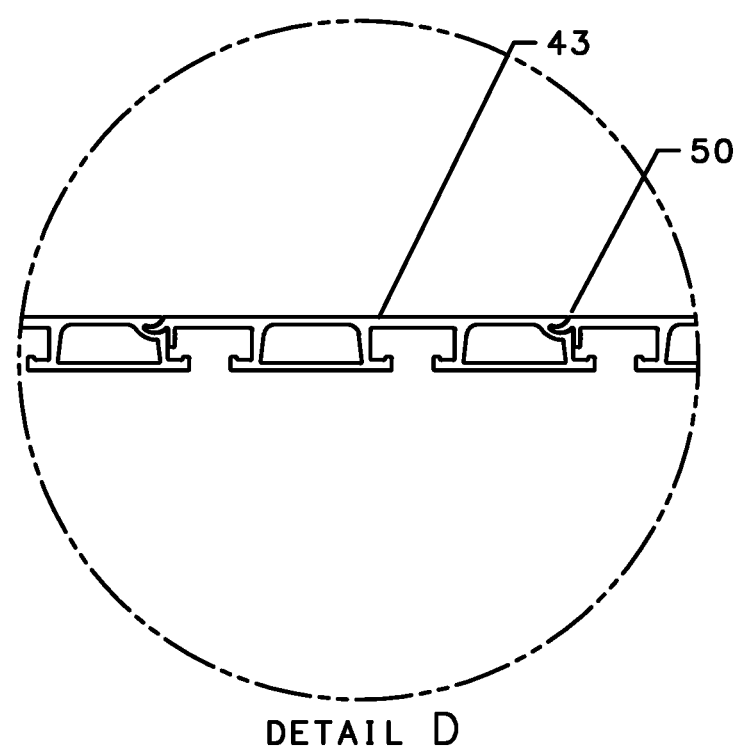
FIG. 3D is an enlarged view of a section of the structural frame shown in FIG. 2, showing a portion of the floor structure in a region adjoining a front axle.
Figure 3E:
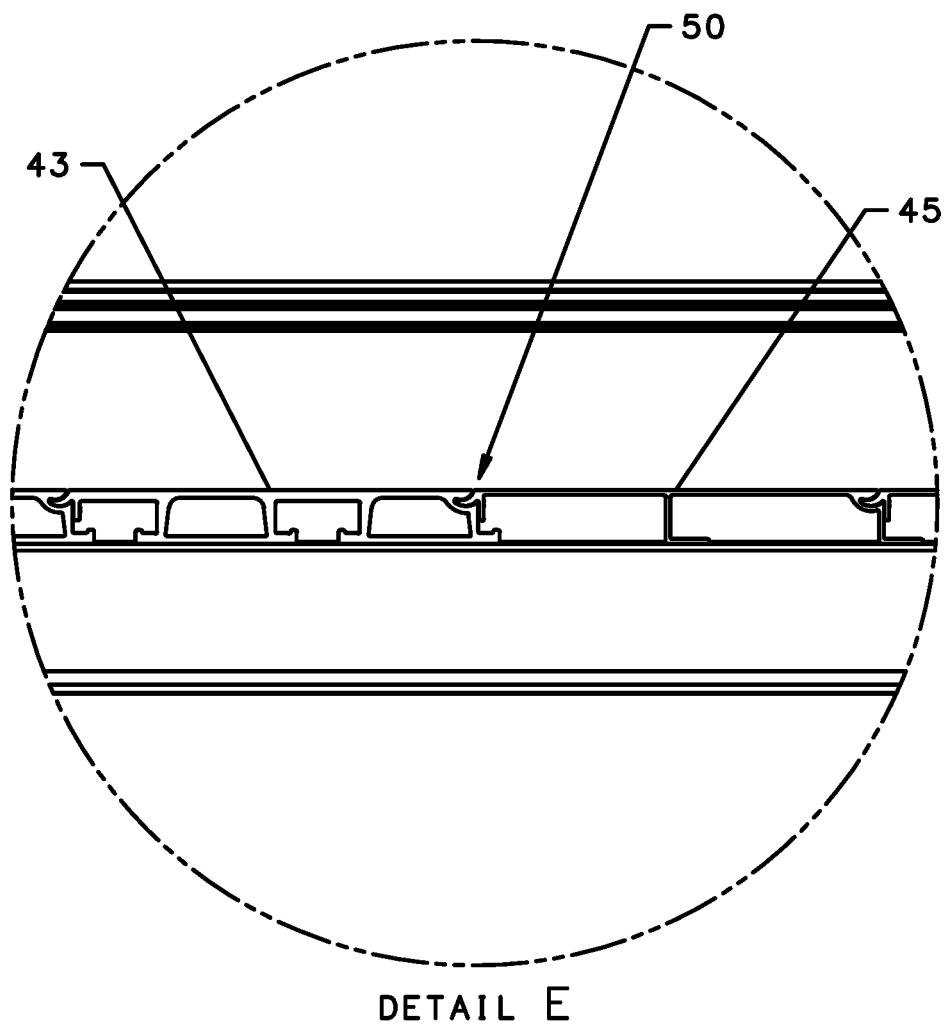
FIG. 3E is an enlarged view of a section of the structural frame shown in FIG. 2, showing a portion of the floor structure and of the elongated floor connectors located forwardly of the front axle.

It can be appreciated that the floor slats 46 are subjected to different loading conditions according to their position with respect to the front and rear axles adjoining zones. In an embodiment, the sections of the floor structure 18 located at and in regions adjoining the front axle and frontwardly of the rear axle are typically subjected to higher loads than the sections of the floor structure located frontwardly of the front axle, between the front and rear axles and rearwardly of the rear axle. Therefore, two types of extrusions having different cross sections are used. More particularly, FIGS. 3D and 3E depict the cross section of two types of elongated floor slats extrusions 43, 45 used in the embodiment of the floor structure 18 described above. The interlocking joints 50 are substantially complementary in shape and, in the embodiment shown on FIGS. 3D and 3E, they are of the tongue and groove type.

It can be appreciated that the position of the first type of elongated floor slats extrusions 43 that have a larger cross-sectional area than the second type of elongated floor slats extrusions 45 can vary along the length of the floor structure 18 according to the floor regions that are more heavily loaded in given loading conditions.

Therefore, in an embodiment, the elongated floor slats extrusions 43 used at and in regions adjoining the front axle and in a region frontwardly of the rear axle have a larger cross-sectional area than the elongated floor slats extrusions 45 positioned at the front and at the rear of the floor structure and between the front and rear axles. It can thus be appreciated that in this configuration, the loads applied to the floor structure 18 can be substantially uniformly distributed along the floor structure 18 and transferred to the front and rear axles.

More specifically, both extrusion profiles include an upper and substantially planar section. A first one of the extrusion profiles, depicted on FIG. 3D, includes two substantially rectangular hollow profiles extending downwardly from a lower face of the planar section. In an embodiment, the wall thickness of the first extrusion profile 43 is thicker than the wall thickness of the second extrusion profile 45. The first extrusion 43 is used near and between the front and rear axle supporting assemblies 93, 95. The second type of extrusion 45, depicted on the right-hand side of FIG. 3E, includes L-shaped legs extending downwardly from the lower face of the planar section. As can be appreciated, the elongated floor slats having the second extrusion profile 45 are thus substantially lighter and contribute to reducing the overall weight of the structural frame 14. As shown on FIG. 3E, both extrusion profiles of elongated floor slats are provided with the interlocking joints 50 to interchangeably assemble adjacent elongated floor slats.

It can be appreciated that in another embodiment (not shown), the plurality of elongated floor slats can extend substantially parallel to the longitudinal axis L to define the upper floor surface 44.

In the embodiment shown, the floor structure 18 is not rectangular in shape and includes openings 19, 21, 42. For instance, rear and front axle-receiving openings 19, 21 are defined in the rear and front sections, on each lateral side of the structural frame 14, to receive the front and rear axle supporting assemblies 93, 95. On the right lateral side, forwardly of the front axle-receiving opening 21, the floor structure 18 defines an access ramp opening 42.

Now referring to FIG. 5, there is shown the floor structure 18 with the elongated floor slats 46 removed. In the embodiment shown, the floor structure 18 comprises a plurality of longitudinally and transversally extending floor beams 47. The floor beams 47 can be made of sheet metal, such as and without being limitative folded aluminum sheets. In another embodiment, the floor beams 47 can be metallic extrusions, such as and without being limitative aluminum-based extrusions. The longitudinally extending floor beams 47 extend mainly between the front and rear axles, and in the front and rear sections of the floor structure, in order to receive and support the elongated floor slats 46 and the main connectors 86 of the elongated floor connectors 52.

Now referring to FIG. 6, there is shown the floor structure 18 with the transversally extending elongated floor slats 46 secured to the floor beams 47 and elongated floor connectors 52. The floor slats placed in the front portion extend substantially on the left lateral side to define the opening 42 for the access ramp on the right lateral side.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A vehicle comprising:
a structural frame having a longitudinal axis and comprising:

a roof structure;

a floor structure vertically spaced apart from the roof structure;

first and second sidewalls extending substantially parallel to the longitudinal axis, between the roof structure and the floor structure and being transversally spaced apart from one another, each one of the first and second sidewalls having an upper edge region mechanically connected to the roof structure and a lower edge region supported by the floor structure;

wherein at least the first sidewall comprises at least one diagonally-extending structural frame member extending upwardly from the lower edge region to the upper edge region of the first sidewall substantially diagonally;

wherein at least the first sidewall further comprises at least one side panel extending upwardly from the lower edge region, the at least one diagonally-extending structural frame member being bonded to the at least one side panel along a bonding surface;

wherein said at least one side panel comprises an inner sheet, an outer sheet, and a lightweight core sandwiched between and bonded to the inner sheet and the outer sheet and an energy supply support mounted to and supported by the roof structure.

2. The vehicle according to claim 1, wherein the at least one diagonally-extending structural frame member extends from the lower edge region to the upper edge region at an angle ranging between about 55 degrees and about 85 degrees with respect to a horizontal axis.

3. The vehicle according to claim 1, further comprising:
a front axle supporting assembly mounted to the floor structure;
a rear axle supporting assembly mounted to the floor structure and being spaced apart longitudinally from the front axle supporting assembly;
the first sidewall having a central section longitudinally extending between the front and rear axle supporting assemblies;
wherein the at least one diagonally-extending structural frame member extends in the central section of the first sidewall.

4. The vehicle according to claim 1, wherein the at least one side panel comprises a plurality of side panels disposed in a horizontally adjacent configuration.

5. The vehicle according to claim 3, wherein the at least one diagonally-extending structural frame member comprises at least one pair of diagonally-extending structural frame members extending upwardly from the lower edge region to the upper edge region substantially diagonally in the central section of the first sidewall.

6. The vehicle according to claim 5, wherein said diagonally-extending structural frame members of a respective one the at least one pair are angled in opposed directions, each one of the diagonally-extending structural frame members of the respective one the at least one pair having a lower end and an upper end, the lower ends of said diagonally-extending structural frame members of the respective one the at least one pair being closer to one another than the upper ends of said diagonally-extending structural frame members of the respective one the at least one pair and wherein absolute values of angles formed by the diagonally-extending structural frame members with respect to a horizontal axis are substantially equal.

7. The vehicle according to claim 6, wherein the at least one diagonally-extending structural frame member comprises first and second pairs of diagonally-extending structural frame members extending upwardly from the lower edge region to the upper edge region substantially diagonally in the central section of the first sidewall, wherein the first and second pairs of diagonally-extending structural frame members are arranged so as to define a substantially vertical plane of symmetry extending substantially transversally relative to the longitudinal axis between the first and second pairs of diagonally-extending structural frame members.

8. The vehicle according to claim 1, wherein the lightweight core of the at least one side panel comprises a polymeric foam material.

9. The vehicle according to claim 1, said at least one diagonally-extending structural frame member having an inner surface and an outer surface, wherein at least one of the inner sheet and the outer sheet of the at least one side panel comprises a section extending past the lightweight core, said section abutting against a corresponding one of the inner surface and the outer surface of said at least one diagonally-extending structural frame member and wherein said section of said at least one of the inner sheet and the outer sheet is bonded to the corresponding one of the inner surface and the outer surface of said at least one diagonally-extending structural frame member.

10. The vehicle according to claim 1, wherein the at least one diagonally-extending structural frame member is at least partially made of aluminum.

11. The vehicle according to claim 1, wherein the at least one diagonally-extending structural frame member has a substantially rectangular cross-section and further comprises a flange protruding outwardly from the substantially rectangular cross-section.

12. The vehicle according to claim 1, wherein the second sidewall has a configuration of diagonally-extending structural frame members identical to the first sidewall.

13. The vehicle according to claim 1, wherein the floor structure has an upper and longitudinally extending floor surface and comprises a plurality of elongated floor slats extending substantially perpendicular to the longitudinal axis and being engageable with adjacent ones of the elongated floor slats to form the longitudinally extending floor surface.

14. The vehicle according to claim 13, wherein each one of the elongated floor slats comprises two opposed transversal edges, each one of the transversal edges having an interlocking joint with the interlocking joint of a first one of the transversal edges being engageable with a second one of the transversal edges to engage together adjacent ones of the elongated floor slats.

15. The vehicle according to claim 14, wherein the interlocking joints are substantially complementary in shape and are of a tongue and groove type.

16. The vehicle according to claim 1, the roof structure having two spaced apart longitudinal edges, the structural frame further comprising a pair of elongated roof connectors transversally spaced apart from one another and extending longitudinally along the upper edge region of each one of the first and second sidewalls, each one of the elongated roof connectors having a roof receiving portion engageable with a respective one of the longitudinal edges of the roof structure and a sidewall receiving portion engageable with a respective one of the upper edge regions of the first and second sidewalls, the elongated roof connectors transferring a weight of the roof structure to the first and second sidewalls.

17. The vehicle according to claim 1, the floor structure having two spaced apart longitudinal edges, the structural frame further comprising a pair of elongated floor connectors transversally spaced apart from one another and extending longitudinally along the lower edge region of each one of the first and second sidewalls, each one of the elongated floor connectors having a floor receiving portion engageable with a respective one of the longitudinal edges of the floor structure and a sidewall receiving portion engageable with a respective one of the lower edge regions of the first and second sidewalls.

18. The vehicle according to claim 1, wherein the vehicle is a motorized vehicle.

19. The vehicle according to claim 17, wherein the at least one side panel comprises a lower edge region and the sidewall receiving portion of at least one of the floor connectors is a side wall-receiving recess, said at least one of the floor connectors comprising inner and outer walls, spaced-apart from each other and at least partially delimiting the side wall-receiving recess, the side wall-receiving recess being dimensioned to receive at least partially the lower edge region of said at least one side panel.

20. The vehicle according to claim 1, said at least one diagonally-extending structural frame member having an inner surface and an outer surface, wherein at least one of the inner sheet and the outer sheet of the at least one side panel is bonded to the corresponding one of the inner surface and the outer surface of said at least one diagonally-extending structural frame member using an adhesive, said adhesive forming bonding interfaces between said at least one diagonally-extending structural frame member and said at least one side panel, said bonding interfaces forming at least partially the bonding surface.

* * * * *